US012609364B2

(12) United States Patent
Yang et al.

(10) Patent No.: US 12,609,364 B2
(45) Date of Patent: Apr. 21, 2026

(54) POSITIVE ELECTRODE PLATE AND PREPARATION METHOD THEREFOR, BATTERY, AND ELECTRICAL APPARATUS

(71) Applicant: CONTEMPORARY AMPEREX TECHNOLOGY CO., LIMITED, Ningde (CN)

(72) Inventors: Qifan Yang, Ningde (CN); Chengyong Liu, Ningde (CN); Bingkun Guo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/284,734

(22) Filed: Jul. 30, 2025

(65) Prior Publication Data

US 2025/0357555 A1 Nov. 20, 2025

Related U.S. Application Data

(63) Continuation of application No. PCT/CN2023/097571, filed on May 31, 2023.

(51) Int. Cl.
*H01M 10/42* (2006.01)
*H01M 4/02* (2006.01)
(Continued)

(52) U.S. Cl.
CPC ....... *H01M 10/4235* (2013.01); *H01M 4/131* (2013.01); *H01M 4/366* (2013.01);
(Continued)

(58) Field of Classification Search
CPC .. H01M 10/4235; H01M 4/131; H01M 4/366; H01M 4/525; H01M 4/628;
(Continued)

(56) References Cited

U.S. PATENT DOCUMENTS

2016/0149261 A1* 5/2016 Zaghib .............. H01M 10/0585 156/60
2021/0050583 A1* 2/2021 Li ........................ H01M 50/581
(Continued)

FOREIGN PATENT DOCUMENTS

CN 102881861 A 1/2013
CN 108110215 A 6/2018
(Continued)

OTHER PUBLICATIONS

The international search report received in the counterpart International Application No. PCT/CN2023/097571, dated Dec. 11, 2023, 8 pages with English translation.
(Continued)

*Primary Examiner* — Christian Roldan
(74) *Attorney, Agent, or Firm* — K&L Gates LLP

(57) ABSTRACT

The present application discloses a positive electrode plate and a preparation method therefor, a positive electrode plate, a battery and an electrical apparatus. The positive electrode plate comprises a positive electrode current collector, and at least one side of the positive electrode plate away from the positive electrode current collector comprises a polymer and an organic solvent, wherein the organic solvent is located in the polymer, and the electrochemical oxidation window of the organic solvent is greater than 4 V.

20 Claims, 3 Drawing Sheets

(51) Int. Cl.

| | |
|---|---|
| ***H01M 4/04*** | (2006.01) |
| ***H01M 4/131*** | (2010.01) |
| ***H01M 4/36*** | (2006.01) |
| ***H01M 4/525*** | (2010.01) |
| ***H01M 4/62*** | (2006.01) |
| ***H01M 10/0525*** | (2010.01) |
| ***H01M 10/0569*** | (2010.01) |

(52) U.S. Cl.
CPC ........... *H01M 4/525* (2013.01); *H01M 4/628* (2013.01); *H01M 10/0525* (2013.01); *H01M 10/0569* (2013.01); *H01M 2004/021* (2013.01); *H01M 2004/028* (2013.01); *H01M 2220/20* (2013.01); *H01M 2300/0034* (2013.01); *H01M 2300/0037* (2013.01)

(58) Field of Classification Search
CPC ......... H01M 10/0525; H01M 10/0569; H01M 2004/021; H01M 2004/028; H01M 2220/20; H01M 2300/0034; H01M 2300/0037
USPC .......................................................... 429/436
See application file for complete search history.

(56) References Cited

U.S. PATENT DOCUMENTS

| | | | | |
|---|---|---|---|---|
| 2022/0115689 | A1* | 4/2022 | Liu | H01M 50/431 |
| 2022/0293955 | A1 | 9/2022 | Jang | |

FOREIGN PATENT DOCUMENTS

| | | | |
|---|---|---|---|
| CN | 109309230 | A | 2/2019 |
| CN | 110048121 | A | 7/2019 |
| CN | 114464765 | A | 5/2022 |
| CN | 115101712 | A | 9/2022 |
| CN | 115832207 | A | 3/2023 |

OTHER PUBLICATIONS

The ISA written opinion received in the counterpart International Application No. PCT/CN2023/097571, dated Dec. 11, 2023, 11 pages with English translation.

* cited by examiner

POSITIVE ELECTRODE PLATE AND PREPARATION METHOD THEREFOR, BATTERY, AND ELECTRICAL APPARATUS

CROSS-REFERENCE TO RELATED APPLICATIONS

The present application is a continuation of International Application PCT/CN2023/097571, filed on May 31, 2023, which is hereby incorporated by reference in its entirety.

TECHNICAL FIELD

The present application belongs to the field of batteries, and more specifically relates to a positive electrode plate and a preparation method therefor, a battery, and an electrical apparatus.

BACKGROUND

Secondary batteries are not only applied in energy storage power source systems such as water, fire, wind, and solar power stations, but also widely applied in electric transportation tools, such as electric bicycles, electric motorcycles, and electric vehicles, as well as many fields, such as military equipment and aerospace. However, existing secondary batteries easily exhibit abnormally increased charging capacity under high-rate and high cut-off voltage (>4 V) charging conditions, causing overcharging risks.

SUMMARY OF THE INVENTION

In view of the technical problems existing in the background art, the present application provides a positive electrode plate in order to reduce the overcharge risk of a secondary battery containing the positive electrode plate.

In order to achieve the above object, one aspect of the present application provides a positive electrode plate including a positive electrode current collector. At least one side of the positive electrode plate away from the positive electrode current collector comprises a polymer and an organic solvent, the organic solvent is located in the polymer, and the electrochemical oxidation window of the organic solvent is higher than 4 V.

The present application comprises at least the following beneficial effects: in the present application, by using a positive electrode plate comprising a polymer and an organic solvent, where the organic solvent is located in the polymer and the polymer and the organic solvent are located on at least one side of the positive electrode plate away from the positive electrode current collector, the polymer filled with the organic solvent can block the direct contact between the positive electrode active material and the solvent in the electrolyte solution of the battery, thereby avoiding the oxidative decomposition of the solvent in the electrolyte solution. In addition, since the electrochemical oxidation window of the organic solvent is higher than 4 V, that is, the organic solvent will not undergo an oxidation reaction on the positive electrode side under the condition of charging at a high cut-off voltage (>4 V), thereby preventing side reactions on the positive electrode side, and under high-rate charging, the organic solvent is not easily excited for oxidative decomposition, thereby preventing additional electrons from reaching the negative electrode side, preventing an abnormal increase in the battery charging capacity, and thus reducing the risk of overcharge of the battery.

In some embodiments, the positive electrode plate comprises a positive electrode active material layer. The positive electrode active material layer is arranged on at least one side of the positive electrode current collector. The positive electrode active material layer comprises positive electrode active particles. The surface of the positive electrode active particles has a polymer layer. The polymer layer comprises the polymer and the organic solvent. Thus, by forming a polymer layer comprising a polymer and an organic solvent on the surface of the positive electrode active particles, the polymer layer can block the direct contact between the positive electrode active material and the solvent in the electrolyte solution of the battery, thereby avoiding oxidative decomposition of the solvent of the electrolyte solution and reducing the risk of overcharge of the battery.

In some embodiments, the positive electrode active material layer further comprises at least one of a binder and a conductive agent. Thus, the conductivity of the positive electrode active material layer and the bonding strength with the positive electrode current collector can be improved.

In some embodiments, the mass ratio of the positive electrode active particles to the binder to the conductive agent is (90-100):(0-5):(0-5), optionally (95-98.5):(0.5-2):(0.5-2). Thus, the conductivity of the positive electrode active material layer and the bonding strength with the positive electrode current collector can be improved.

In some embodiments, the thickness of the positive electrode active material layer is 30-60 μm, optionally 30-50 μm. Thus, the positive electrode active material layer having this thickness can improve the energy density of the battery.

In some embodiments, the thickness of the polymer layer is 0.01-2 μm, optionally 0.01-1 μm. Thus, the formation of the polymer layer having the thickness on the surface of the positive electrode active particles can not only block the direct contact between the positive electrode active material and the solvent in the electrolyte solution of the battery, thereby avoiding oxidative decomposition of the solvent of the electrolyte solution, but can also reduce the impedance of the positive electrode plate.

In some embodiments, the mass ratio of the polymer to the organic solvent is (0.1-99):(1-99.9), optionally (0.1-15):(85-99.9). Thus, the direct contact between the positive electrode active material and the solvent in the electrolyte solution of the battery can be blocked, thereby avoiding oxidative decomposition of the solvent of the electrolyte solution and reducing the risk of overcharge of the battery.

In some embodiments, the polymer layer further comprises an electrolyte salt. Thus, the ion conductivity of the polymer layer can be improved.

In some embodiments, in the polymer layer, based on the total amount of the organic solvent and the electrolyte salt, the concentration of the electrolyte salt is 0.1-10 mol/L, optionally 0.5-5 mol/L. Thus, the ion conductivity of the polymer layer can be improved.

In some embodiments, the polymer layer further comprises at least one of a film-forming additive and an adsorption additive. Thus, the cycling stability of the positive electrode plate can be improved.

In some embodiments, the electrochemical oxidation window of the film-forming additive is less than or equal to 4 V.

In some embodiments, the electrochemical oxidation window of the adsorption additive is higher than 4 V.

In some embodiments, the mass ratio of the polymer to the film-forming additive to the adsorption additive is (10-100):(0-90):(0-90), optionally (30-80):(20-70):(20-70). Thus, the cycling stability of the positive electrode plate can be improved.

In some embodiments, the positive electrode plate comprises a positive electrode active material layer and a protective layer. The positive electrode active material layer is arranged on at least one side of the positive electrode current collector. The protective layer is arranged on at least one side of the positive electrode active material layer. The protective layer comprises the polymer and the organic solvent. Thus, by forming a protective layer comprising a polymer and an organic solvent on the surface of the positive electrode active material layer, the protective layer can block the direct contact between the positive electrode active material and the solvent in the electrolyte solution of the battery, thereby avoiding oxidative decomposition of the solvent of the electrolyte solution and reducing the risk of overcharge of the battery.

In some embodiments, the thickness of the protective layer is 0.1-40 μm, optionally 1-20 μm, more optionally 1-10 μm. Thus, the formation of the protective layer having the thickness on the surface of the positive electrode active material layer can not only block the direct contact between the positive electrode active material and the solvent in the electrolyte solution of the battery, thereby avoiding oxidative decomposition of the solvent of the electrolyte solution, but can also reduce the impedance of the positive electrode plate.

In some embodiments, in the protective layer, the mass ratio of the polymer to the organic solvent is (0.1-99):(1-99.9), optionally (0.1-15):(85-99.9). Thus, the direct contact between the positive electrode active material and the solvent in the electrolyte solution of the battery can be blocked, thereby avoiding oxidative decomposition of the solvent of the electrolyte solution and reducing the risk of overcharge of the battery.

In some embodiments, the protective layer further comprises an electrolyte salt. Thus, the ion conductivity of the protective layer can be improved.

In some embodiments, in the protective layer, based on the total amount of the organic solvent and the electrolyte salt, the concentration of the electrolyte salt is 0.1-10 mol/L, optionally 0.5-5 mol/L. Thus, the ion conductivity of the protective layer can be improved.

In some embodiments, the protective layer further comprises at least one of a film-forming additive and an adsorption additive. Thus, the cycling stability of the positive electrode plate can be improved.

In some embodiments, the electrochemical oxidation window of the film-forming additive is less than or equal to 4 V.

In some embodiments, the electrochemical oxidation window of the adsorption additive is higher than 4 V.

In some embodiments, the mass ratio of the polymer to the film-forming additive to the adsorption additive is (10-100):(0-90):(0-90), optionally (30-80):(20-70):(20-70). Thus, the cycling stability of the positive electrode plate can be improved.

In some embodiments, the organic solvent comprises at least one of a carbonate, a carboxylate, $C_5$-$C_{16}$ alkane, an aromatic hydrocarbon with an electron-withdrawing group and/or an alkyl group, a nitrile, and a ketone, and the electron-withdrawing group includes at least one of halogen, —$NO_2$, —C≡N, —C=C, —C≡C, and —$OCH_3$. Thus, by filling the polymer layer with this type of organic solvent, the direct contact between the positive electrode active material and the solvent in the electrolyte solution of the battery can be blocked, thereby avoiding oxidative decomposition of the solvent of the electrolyte solution and reducing the risk of overcharge of the battery.

In some embodiments, the film-forming additive comprises at least one of bis(oxalato)borate, difluoro(oxalato) borate, difluorophosphate, methyl trifluoroethyl carbonate, tris(pentafluorophenyl)borane, fluoroethylene carbonate, methyl trifluoroethyl carbonate, and propylene trifluorocarbonate.

In some embodiments, the adsorption additive comprises at least one of a carbonate, a phosphate, a nitrile, and an ionic liquid.

In some embodiments, the electrochemical oxidation window of the polymer is higher than 4 V. Thus, under high cut-off voltage (>4 V) and high-rate charging conditions, no oxidation reaction will occur on the positive electrode side, thus reducing the risk of overcharge of the battery.

In some embodiments, the swelling degree of the polymer is 5-2,000%, optionally 50-1,500%. Thus, the liquid retention performance of the polymer can be improved, and the direct contact between the positive electrode active material and the solvent in the electrolyte solution of the battery can be blocked, thereby avoiding oxidative decomposition of the solvent of the electrolyte solution and reducing the risk of overcharge of the battery.

In some embodiments, the crosslinking density of the polymer is 1-100%, optionally 30-70%. Thus, the liquid retention performance of the polymer can be improved, and the direct contact between the positive electrode active material and the solvent in the electrolyte solution of the battery can be blocked, thereby avoiding oxidative decomposition of the solvent of the electrolyte solution and reducing the risk of overcharge of the battery.

In some embodiments, the number average molecular weight of the polymer is 10,000-1,000,000, optionally 50,000-600,000. Thus, the liquid absorption and retention performance of the polymer can be improved, and the direct contact between the positive electrode active material and the solvent in the electrolyte solution of the battery can be blocked, thereby avoiding oxidative decomposition of the solvent of the electrolyte solution and reducing the risk of overcharge of the battery.

In some embodiments, the polymer comprises the following repeating unit:

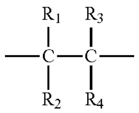

where $R_1$-$R_4$ each independently include H, alkyl, F, Cl, Br, I, C≡N, phenyl, pyrrolyl, pyrrolidonyl, sulfonic acid group, sulfonate group, benzenesulfonate group, carboxylic acid group, and carbonic acid group.

Thus, by filling the polymer with the organic solvent, the adsorption performance of the polymer to the organic solvent can be improved, thereby effectively avoiding the direct contact between the positive electrode active material and the solvent in the electrolyte solution of the battery, thus avoiding oxidative decomposition of the solvent of the electrolyte solution and reducing the risk of overcharge of the battery.

In some embodiments, the repeating unit includes at least one of the following structural formulas:

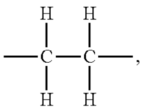,
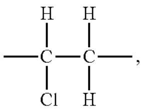,
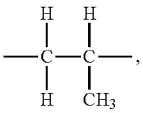,

-continued

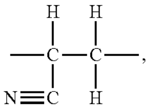, 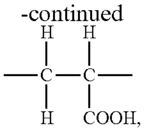, 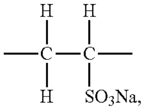,

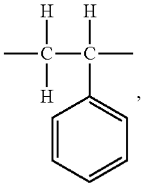, 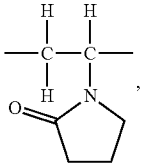, and 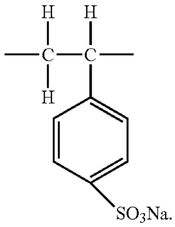.

Thus, by filling the polymer having this composition with the organic solvent, the adsorption performance of the polymer to the organic solvent can be improved, thereby effectively avoiding the direct contact between the positive electrode active material and the solvent in the electrolyte solution of the battery, thus avoiding oxidative decomposition of the solvent of the electrolyte solution and reducing the risk of overcharge of the battery.

In a second aspect of the present application, the present application provides a method for preparing a positive electrode plate, comprising: forming a positive electrode plate comprising a polymer and an organic solvent, where the polymer and the organic solvent are located on at least one side of the positive electrode plate away from the positive electrode current collector, the organic solvent is located in the polymer, and the electrochemical oxidation window of the organic solvent is higher than 4 V.

Thus, the positive electrode plate comprising the polymer and the organic solvent can be prepared. The organic solvent is located in the polymer and the polymer and the organic solvent are located on at least one side of the positive electrode plate away from the positive electrode current collector. The polymer filled with the organic solvent can block the direct contact between the positive electrode active material and the solvent in the electrolyte solution of the battery, thereby avoiding the oxidative decomposition of the solvent in the electrolyte solution. In addition, since the electrochemical oxidation window of the organic solvent is higher than 4 V, that is, the organic solvent will not undergo an oxidation reaction on the positive electrode side under the condition of charging at a high cut-off voltage (>4 V), thereby preventing side reactions on the positive electrode side, and under high-rate charging, the organic solvent is not easily excited for oxidative decomposition, thereby preventing additional electrons from reaching the negative electrode side, preventing an abnormal increase in the battery charging capacity, and thus reducing the risk of overcharge of the battery.

In some embodiments, the method for forming the positive electrode plate comprising the polymer and the organic solvent comprises: forming a positive electrode active material layer comprising positive electrode active particles on at least one side of the positive electrode current collector, and forming a polymer layer comprising the polymer and the organic solvent on the surface of the positive electrode active particles. Thus, by forming a polymer layer comprising a polymer and an organic solvent on the surface of the positive electrode active particles, the polymer layer can block the direct contact between the positive electrode active material and the solvent in the electrolyte solution of the battery, thereby avoiding oxidative decomposition of the solvent of the electrolyte solution and reducing the risk of overcharge of the battery.

In some embodiments, the method for forming the positive electrode plate comprising the polymer and the organic solvent comprises: forming a positive electrode active material layer on at least one side of the positive electrode current collector; and forming a protective layer comprising the polymer and the organic solvent on at least one side of the positive electrode active material layer. Thus, by forming a protective layer comprising a polymer and an organic solvent on the surface of the positive electrode active material layer, the protective layer can block the direct contact between the positive electrode active material and the solvent in the electrolyte solution of the battery, thereby avoiding oxidative decomposition of the solvent of the electrolyte solution and reducing the risk of overcharge of the battery.

A third aspect of the present application provides a battery, comprising the above positive electrode plate.

In some embodiments, the battery comprises an electrolyte solution, the electrolyte solution comprises a main solvent, and the main solvent is different from the organic solvent in the positive electrode plate.

In some embodiments, the battery comprises an electrolyte solution, and the electrochemical oxidation window of the main solvent is less than or equal to 4 V.

A fourth aspect of the present application provides an electrical apparatus. The electrical apparatus comprises the above battery.

Additional aspects and advantages of the present application will be set forth in part in the description which follows, and in part will be obvious from the description which follows, or may be learned by practice of the present application.

DESCRIPTION OF DRAWINGS

By reading the detailed description of the preferred embodiments below, various other advantages and benefits will become apparent to those of ordinary skill in the art. The drawings are used for the purpose of illustrating the preferred embodiments only and are not to be considered a limitation to the present application. Moreover, in all of the drawings, like reference numerals represent like components. In the accompanying drawings.

DESCRIPTION OF REFERENCE NUMERALS

Figure 1:
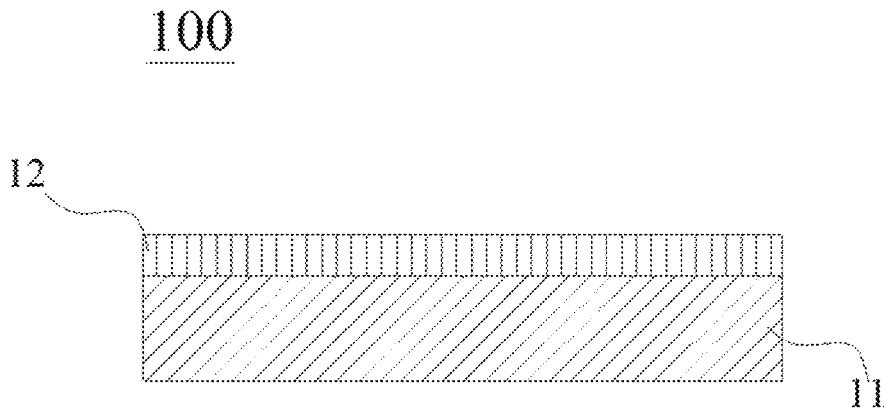
FIG. 1 is a schematic structural view of a positive electrode plate according to one embodiment of the present application.

100: positive electrode plate; 11: positive electrode current collector; 12: positive electrode active material layer;

13: protective layer; 1: secondary battery; 2: battery module; 3: battery pack; 4: upper box; and 5: lower box.

DETAILED DESCRIPTION

The embodiments of the technical solution of the present application will be described in detail below. The following embodiments are only used to more clearly illustrate the technical solutions of the present application, therefore only as examples, and cannot be used to limit the scope of protection of the present application.

Reference to "an embodiment" herein means that a particular feature, structure, or characteristic described with reference to an embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

For conciseness, only certain numerical ranges are explicitly disclosed herein. However, any lower limit can be combined with any upper limit to form a range that is not explicitly recited; any lower limit can be combined with another lower limit to form a range that is not explicitly recited; and any upper limit may be combined with another upper limit to form a range that is not explicitly recited. Moreover, each separately disclosed point or single numerical value itself can be used as a lower or upper limit to form a range, which is not explicitly stated, in combination with any other point or single numerical value or with other lower or upper limits.

In the description of the embodiments of the present application, the term "and/or" is simply a description of an association relationship of associated objects and indicates that there may be three relationships, for example, A and/or B may represent three situations: A exists alone, both A and B exist, and B exists alone. Moreover, the character "/" herein generally indicates that the context objects are in an "or" relationship.

Unless otherwise defined, all technical and scientific terms used herein have the same meanings as commonly understood by those skilled in the technical field to which the present application belongs. The terms used herein are intended only for the purpose of describing specific embodiments and are not intended to limit the present application. The terms "include" and "have" and any variations thereof in the specification and the claims of the present application and in the above Description of Drawings are intended to encompass non-exclusive inclusion.

With the technical development and increasing demand of electric vehicles and rechargeable mobile devices, the research work related to secondary batteries, as a representative of the new energy field, is also developing rapidly. With the continuous expansion of the application field of power batteries, the market demand is also constantly expanding.

The electrolyte solution serves to conduct ions between the positive electrode and the negative electrode of the secondary battery, and the electrolyte solution comprises an electrolyte salt and a solvent. In order to promote the application of a metal negative electrode, an electrolyte solution with reduction resistance and compatibility with the metal negative electrode is developed. However, the oxidation window of this type of electrolyte solution has difficulty in matching with high-voltage positive electrode materials. Under high cut-off voltage (>4 V) charging condition, the solvent in this type of electrolyte solution is easily oxidized at the positive electrode interface, resulting in serious interfacial side reactions. In addition, when charging at a high rate, the space charge effect on the positive electrode side is too strong, which stimulates the oxidative decomposition of the solvent. During the oxidation of the solvent on the positive electrode side interface, the solvent loses electrons, and these electrons reach the negative electrode side via an external circuit to form a loop, which manifests as an increase in the charging capacity of the battery. However, these side reactions are irreversible. These electrons that have reached the negative electrode side cannot return to the positive electrode during the discharging process of the battery, which leads to an abnormal increase in the charging capacity, resulting in the risk of overcharge.

In order to solve the above problems, an attempt has been made in the prior art to use an oxidation-resistant electrolyte solution solvent to replace the solvent with a relatively low electrochemical oxidation window in the electrolyte solution. However, since the oxidation-resistant electrolyte solution is not resistant to reduction, the oxidation-resistant electrolyte solution easily undergoes side reactions on the negative electrode side during the charging process of the battery, thereby deteriorating the negative electrode, thus reducing the cycling performance of the battery.

In the present application, by using a positive electrode plate comprising a polymer and an organic solvent, where the organic solvent is located in the polymer, the polymer filled with the organic solvent can block the direct contact between the positive electrode active material and the solvent of the electrolyte solution, thereby avoiding the oxidative decomposition of the solvent in the electrolyte solution. In addition, since the electrochemical oxidation window of the organic solvent is higher than 4 V, that is, the organic solvent will not undergo an oxidation reaction on the positive electrode side under the condition of charging at a high cut-off voltage (>4 V), thereby preventing side reactions on the positive electrode side, and under high-rate charging, the organic solvent is not easily excited for oxidative decomposition, thereby preventing additional electrons from reaching the negative electrode side, preventing an abnormal increase in the battery charging capacity, and thus reducing the risk of overcharge.

The battery disclosed in the embodiments of the present application can be used in an electrical apparatus in which a battery is used as a power source or in various energy storage systems in which a battery is used as an energy storage element. The electrical apparatus can be, but is not limited to, a mobile phone, a tablet, a laptop, an electric toy, an electric tool, a storage battery car, an electric vehicle, a ship, a spacecraft, etc. Electric toys can include fixed or mobile electric toys, e.g., game consoles, electric car toys, electric ship toys, and electric airplane toys, and the spacecraft can include airplanes, rockets, space shuttles, spaceships, etc.

In a first aspect, the present application provides a positive electrode plate. The positive electrode plate comprises a positive electrode current collector. At least one side of the positive electrode plate away from the positive electrode current collector comprises a polymer and an organic solvent. The organic solvent is located in the polymer. The electrochemical oxidation window of the organic solvent is higher than 4 V.

In the present application, by using a positive electrode plate comprising a polymer and an organic solvent, where the organic solvent is located in the polymer and the polymer and the organic solvent are located on at least one side of the positive electrode plate away from the positive electrode current collector, the polymer filled with the organic solvent can block the direct contact between the positive electrode active material and the solvent in the electrolyte solution of the battery, thereby avoiding the oxidative decomposition of the solvent in the electrolyte solution. In addition, since the electrochemical oxidation window of the organic solvent is higher than 4 V, that is, the organic solvent will not undergo an oxidation reaction on the positive electrode side under the condition of charging at a high cut-off voltage (>4 V), thereby preventing side reactions on the positive electrode side, and under high-rate charging, the organic solvent is not easily excited for oxidative decomposition, thereby preventing additional electrons from reaching the negative electrode side, preventing an abnormal increase in the battery charging capacity, and thus reducing the risk of overcharge of the battery.

In the present application, the meaning of the "electrochemical oxidation window" refers to a potential range in which a redox reaction does not occur in a voltammetry test. The higher the electrochemical oxidation window of the organic solvent, the higher the oxidation potential of the corresponding organic solvent, that is, the organic solvent is not easily oxidized, and in order to reduce the side reactions of the organic solvent on the positive electrode side, the electrochemical oxidation window of the organic solvent used in the present application is higher than the cut-off voltage of the battery during charging. Furthermore, the test method for "the electrochemical oxidation window of the organic solvent" in the present application comprises cyclic voltammetry and linear sweep voltammetry.

In the present application, "at least one side of the positive electrode plate away from the positive electrode current collector comprises a polymer and an organic solvent" can be understood as follows: when the positive electrode current collector is coated on one side, the polymer and the organic solvent are located on the side of the coating layer away from the positive electrode current collector; and when the positive electrode current collector is coated on both sides, the polymer and the organic solvent are located on the side of one or both of the coating layers away from the positive electrode current collector.

In some embodiments of the present application, referring to FIG. 1, the positive electrode plate 100 comprises a positive electrode current collector 11 and a positive electrode active material layer 12. The positive electrode active material layer 12 is arranged on at least one side of the positive electrode current collector 11. The positive electrode active material layer 12 comprises positive electrode active particles. The surface of the positive electrode active particles has a polymer layer. The polymer layer comprises the polymer and the organic solvent.

It needs be noted that "the organic solvent is located in the polymer" in the present application means that the polymer absorbs or adsorbs the organic solvent in the molecular network thereof by using the swelling property thereof.

In the present application, by forming a polymer layer comprising a polymer and an organic solvent on the surface of the positive electrode active particles, the polymer layer can block the direct contact between the positive electrode active material and the solvent in the electrolyte solution of the battery, thereby avoiding oxidative decomposition of the solvent of the electrolyte solution and reducing the risk of overcharge of the battery. In addition, since the electrochemical oxidation window of the organic solvent is higher than 4 V, that is, the organic solvent will not undergo an oxidation reaction on the positive electrode side under the condition of charging at a high cut-off voltage (>4 V), thereby preventing side reactions on the positive electrode side, and under high-rate charging, the organic solvent is not easily excited for oxidative decomposition, thereby preventing additional electrons from reaching the negative electrode side, preventing an abnormal increase in the battery charging capacity, and thus reducing the risk of overcharge of the battery.

In some embodiments of the present application, the positive electrode current collector 11 can be made of a conventional metal foil or a composite positive electrode current collector (a metal material can be arranged on a polymer substrate to form a composite positive electrode current collector). By way of example, the positive electrode current collector 11 can include one or more of an aluminum foil, a nickel foil, a stainless steel foil, a stainless steel mesh, and a carbon-coated aluminum foil.

In some embodiments of the present application, the specific type of the positive electrode active particle material is not limited. Active materials known in the art that can be used as active materials for positive electrodes of batteries can be used, and those skilled in the art can make a choice according to actual needs.

For example, when the battery is a lithium-ion battery, the positive electrode active particle material can include, but is not limited to, by way of example, one or more of a lithium transition metal oxide, a lithium-containing phosphate with an olivine structure, and respective modified compounds thereof. Examples of the lithium transition metal oxide can include, but are not limited to, one or more of lithium-cobalt oxide, lithium-nickel oxide, lithium-manganese oxide, lithium-nickel-cobalt oxide, lithium-manganese-cobalt oxide, lithium-nickel-manganese oxide, lithium-nickel-cobalt-manganese oxide, lithium-nickel-cobalt-aluminum oxide, and modified compounds thereof. Examples of the lithium-containing phosphate with an olivine structure can include, but are not limited to, one or more of lithium iron phosphate, a composite material of lithium iron phosphate and carbon, lithium manganese phosphate, a composite material of lithium manganese phosphate and carbon, lithium iron manganese phosphate, a composite material of lithium iron manganese phosphate and carbon, and modified compounds thereof. These materials are all commercially available.

For example, when the battery is a sodium-ion battery, the positive electrode active particle material can include, by way of example, but not limited to at least one of a layered transition metal oxide, a polyanionic compound, and a Prussian blue analog.

As examples of the above layered transition metal oxide, for example, the following can be listed:

$Na_{1-x}Cu_hFe_kMn_lM^1_mO_{2-y}$, in which $M^1$ is one or more of Li, Be, B, Mg, Al, K, Ca, Ti, Co, Ni, Zn, Ga, Sr, Y, Nb, Mo, In, Sn, and Ba, $0<x\leq 0.33$, $0<h\leq 0.24$, $0\leq k\leq 0.32$, $0<l\leq 0.68$, $0\leq m<0.1$, $h+k+l+m=1$, and $0\leq y<0.2$;

$Na_{0.67}Mn_{0.7}Ni_zM^2_{0.3-z}O_2$, in which $M^2$ is one or more of Li, Mg, Al, Ca, Ti, Fe, Cu, Zn, and Ba, and $0<z\leq 0.1$; and $Na_aLi_bNi_cMn_dFe_eO_2$, in which $0.67<a\leq 1$, $0<b<0.2$, $0<c<0.3$, $0.67<d+e<0.8$, and $b+c+d+e=1$.

As examples of the above polyanionic compound, for example, the following can be listed:

$A^1_fM^3_g(PO_4)_iO_jX^1_{3-j}$, in which $A^1$ is one or more of H, Li, Na, K, and $NH_4$, $M^3$ is one or more of Ti, Cr, Mn, Fe, Co, Ni, V, Cu, and Zn, $X^1$ is one or more of F, Cl, and Br, $0<f\leq 4$, $0<g\leq 2$, $1\leq i\leq 3$, and $0\leq j\leq 2$;

$Na_nM^4PO_4X^2$, in which $M^4$ is one or more of Mn, Fe, Co, Ni, Cu, Zn, $X^2$ is one or more of F, Cl, and Br, and $0<n\leq 2$;

$Na_pM^5_q(SO_4)_3$, in which $M^5$ is one or more of Mn, Fe, Co, Ni, Cu, and Zn, $0<p\leq 2$, and $0<q\leq 2$; and $Na_sMn_tFe_{3-t}(PO_4)_2(P_2O_7)$, in which $0<s\leq 4$, and $0\leq t\leq 3$, for example, t is 0, 1, 1.5, 2, or 3.

As examples of the above Prussian blue analog, for example, the following can be listed:

$A_uM^6_v[M^7(CN)_6]_w\cdot xH_2O$, in which A is one or more of $H^+$, $NH_4^+$, an alkali metal cation, and an alkaline earth metal cation, $M^6$ and $M^7$ are each independently one or more of transition metal cations, $0<u\leq 2$, $0<v\leq 1$, $0<w\leq 1$, and $0<x<6$. For example, A is one or more of $H^+$, $Li^+$, $Na^+$, $K^+$, $NH_4^+$, $Rb^+$, $Cs^+$, $Fr^+$, $Be^{2+}$, $Mg^{2+}$, $Ca^{2+}$, $Sr^{2+}$, $Ba^{2+}$, and $Ra^{2+}$, $M^6$ and $M^7$ are each independently one or more of cations of the transition metal elements Ti, V, Cr, Mn, Fe, Co, Ni, Cu, Zn, Sn, and W.

The modified compound of each of the above materials can involve doping modification and/or surface coating modification of the material.

The positive electrode active material layer generally further comprises optionally at least one of a binder and a conductive agent. The conductive agent is used for improving the conductivity of the positive electrode active material layer, and the binder is used for firmly bonding the positive electrode active material and the binder to the positive electrode current collector. In the present application, the types of the conductive agent and the binder are not specifically limited and can be selected according to actual needs.

By way of example, the conductive agent can include one or more of superconducting carbon, acetylene black, carbon black, Ketjen black, carbon dots, carbon nanotubes, Super P (SP), graphene, and carbon nanofibers.

By way of example, the binder can include one or more of styrene butadiene rubber (SBR), water-based acrylic resin, polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA), and polyvinyl butyral (PVB).

In some embodiments of the present application, the mass ratio of the positive electrode active particles to the binder to the conductive agent is (90-100):(0-5):(0-5), e.g., (92-99):(0-5):(0-5), (94-98):(0-5):(0-5), (95-97):(0-5):(0-5), (95-96):(0-5):(0-5), (90-100):(0.5-5):(0-5), (90-100):(1-4):(0-5), (90-100):(2-3):(0-5), (90-100):(0-5):(0.5-5), (90-100):(0-5):(1-4), (90-100):(0-5):(1-3), (90-100):(0-5):(1-2), (96-99):(0.5-1):(0.5-1), etc. In some embodiments of the present application, the mass ratio of the positive electrode active particles to the binder to the conductive agent is (95-98.5):(0.5-2):(0.5-2). Thus, by using the positive electrode active particles, the conductive agent, and the binder in a ratio of the present application to form a positive electrode slurry, the conductivity of the positive electrode active material layer and the bonding strength with the positive electrode current collector can be improved.

In some embodiments of the present application, the thickness of the positive electrode active material layer 11 in the above positive electrode plate 100 can be 30-60 μm, e.g., 30-58 μm, 30-55 μm, 30-52 μm, 30-50 μm, 32-48 μm, 35-45 μm, 38-42 μm, and 40-42 μm. Thus, the positive electrode active material layer having this thickness can improve the energy density of the battery. In some other embodiments of the present application, the thickness of the positive electrode active material layer 11 can be 30-50 μm.

In some embodiments of the present application, the thickness of the polymer layer formed on the surface of the positive electrode active particles can be 0.01-2 μm, e.g., 0.01-1.8 μm, 0.02-1.6 μm, 0.05-1.5 μm, 0.08-1.2 μm, 0.1-1 μm, 0.1-0.8 μm, 0.1-0.6 μm, 0.1-0.5 μm, 0.1-0.4 μm, 0.1-0.34 μm, and 0.1-0.2 μm. In some other embodiments of the present application, the thickness of the polymer layer formed on the surface of the positive electrode active particles can be 0.01-1 μm. Thus, the formation of the polymer layer having the thickness on the surface of the positive electrode active particles can not only effectively block the direct contact between the positive electrode active material and the solvent in the electrolyte solution of the battery, thereby avoiding oxidative decomposition of the solvent of the electrolyte solution, but can also reduce the impedance of the positive electrode plate.

In some embodiments of the present application, the mass ratio of the polymer to the organic solvent in the polymer layer can be (0.1-99):(1-99.9), e.g., (0.5-98):(1-99.9), (1-97):(1-99.9), (5-95):(1-99.9), (10-90):(1-99.9), (15-85):(1-99.9), (20-80):(1-99.9), (25-75):(1-99.9), (30-70):(1-99.9), (40-60):(1-99.9), (50-60):(1-99.9), (0.1-99):(2-99), (0.1-99):(4-97), (0.1-99):(5-95), (0.1-99):(10-90), (0.1-99):(15-85), (0.1-99):(20-80), (0.1-99):(25-75), (0.1-99):(30-70), (0.1-99):(40-60), and (0.1-99):(50-60). In some other embodiments of the present application, the mass ratio of the polymer to the organic solvent in the polymer layer can be (0.1-15):(85-99.9). Thus, by using the polymer and the organic solvent in the above ratio to form a polymer layer on the surface of the positive electrode active particles, the direct contact between the positive electrode active material and the solvent in the electrolyte solution of the battery can be blocked, thereby avoiding oxidative decomposition of the solvent of the electrolyte solution and reducing the risk of overcharge of the battery.

In some embodiments of the present application, the organic solvent comprises at least one of a carbonate, a carboxylate, $C_5$-$C_{16}$ alkane, an aromatic hydrocarbon with an electron-withdrawing group and/or an alkyl group, a nitrile, and a ketone, and the electron-withdrawing group includes at least one of halogen, $-NO_2$, $-C\equiv N$, $-C=C$, $-C\equiv C$, and $-OCH_3$.

By way of example, the carbonate includes, but is not limited to, at least one of vinyl carbonate, propylene carbonate, dimethyl carbonate, diethyl carbonate, ethyl methyl carbonate, dipropyl carbonate, diphenyl carbonate, dibutyl carbonate, and butylene carbonate, and the carboxylate includes but is not limited to at least one of propyl butyrate, propyl acetate, isopropyl acetate, ethyl propionate, propyl propionate, butyl propionate, isopropyl propionate, and ethyl butyrate; the $C_5$-$C_{16}$ alkane represents an alkane with a carbon atom number of 5-16, including but not limited to n-pentane, isopentane, neopentane, n-hexane, isohexane, 3-methylpentane, 2,3-dimethylbutane, 2,2-dimethylbutane, n-heptane, 2-methylhexane, 3-methylhexane, 2,4-dimethylpentane, 2,3-dimethylpentane, 2,2-dimethylpentane, 3,3-dimethylpentane, 3-ethylpentane, 2,2,3-trimethylbutane, n-octane, 2-methylheptane, 3-methylheptane, 4-methylheptane, 2,2-dimethylhexane, 3,3-dimethylhexane, 2,3-dimethylhexane, 2,4-dimethylhexane, 2,5-dimethylhexane, 3,4-dimethylhexane, nonane, 2-methyloctane, 3-methyloctane, 4-methyloctane, 3-ethylheptane, 4-ethylheptane, 2,2-dimethylheptane, 2,3-dimethylheptane, n-decane, 2-methylnonane, 3-methylnonane, 4-methylnonane, 3-ethyloctane, 2,3-dimethyldecane, 2,4-dimethyldecane, 2,2,3-trimethylquinane, 2,2,3,3-tetramethylquinane, 4,4-diethylquinane, 3,4,4-triethylquinane, etc.

By way of example, the function of the electron-withdrawing group in the aromatic hydrocarbon with an electron-withdrawing group and/or an alkyl group is to improve the oxidation resistance of the organic solvent, and the function of the alkyl group is to reduce the melting point of the aromatic hydrocarbon and improve the boiling point and oxidation resistance thereof. The alkyl group can include $C_1$-$C_5$ alkyl, and the $C_1$-$C_5$ alkyl can be understood as being an alkyl group having a carbon atom number of 1-5, e.g., methyl ($—CH_3$), ethyl ($—CH_2CH_3$), n-propyl ($—CH_2CH_2CH_3$), isopropyl ($—CH(CH_3)_2$), n-butyl ($—CH_2CH_2CH_2CH_3$), tert-butyl ($—C(CH_3)_3$), n-pentyl ($—CH_2CH_2CH_2CH_2CH_3$), etc. The aromatic hydrocarbon with an electron-withdrawing group and/or an alkyl group can include, but is not limited to, at least one of chlorobenzene, bromobenzene, iodobenzene, fluorobenzene, nitrobenzene, cyanobenzene, styrene, phenylacetylene, anisole, toluene, ethylbenzene, propylbenzene, p-chlorotoluene, m-chlorotoluene, 1,2-dimethyl-3-ethylbenzene, butylbenzene, p-chlorobutylbenzene, pentylbenzene, etc.

By way of example, the nitrile can include, but is not limited to, at least one of acetonitrile, propionitrile, butyronitrile, isobutyronitrile, valeronitrile, 3-methoxypropionitrile, and cyclopentanenitrile; and the ketone can include, but is not limited to, at least one of acetone, methyl butanone, methyl isobutyl ketone, etc.

Thus, by filling the polymer layer with the above type of organic solvent, the direct contact between the positive electrode active material and the solvent in the electrolyte solution of the battery can be blocked, thereby avoiding oxidative decomposition of the solvent of the electrolyte solution and reducing the risk of overcharge of the battery. In addition, since the electrochemical oxidation window of this type of organic solvent is higher than 4 V, that is, the organic solvent will not undergo an oxidation reaction on the positive electrode side under the condition of charging at a high cut-off voltage (>4 V), thereby preventing side reactions on the positive electrode side, and under high-rate charging, this type of organic solvent is not easily excited for oxidative decomposition, thereby preventing additional electrons from reaching the negative electrode side, preventing an abnormal increase in the battery charging capacity, and thus reducing the risk of overcharge of the battery.

In some embodiments of the present application, the electrochemical oxidation window of the polymer in the polymer layer is higher than 4 V. Thus, under high cut-off voltage (>4 V) and high-rate charging conditions, no oxidation reaction will occur on the positive electrode side, thus reducing the risk of overcharge of the battery.

In the present application, for the test method for "the electrochemical oxidation window of the polymer", reference can be made to the above test method for "the electrochemical oxidation window of the organic solvent". In order to reduce the side reactions of the polymer on the positive electrode side, the electrochemical oxidation window of the polymer used in the present application is higher than the cut-off voltage during the charging process of the battery.

In some embodiments of the present application, the swelling degree of the polymer is 5-2,000%, e.g., 10-1,990%, 50-1,900%, 70-1,800%, 100-1,700%, 150-1,600%, 200-1,500%, 300-1,400%, 400-1,300%, 500-1,200%, 600-1,100%, 700-1,000%, and 800-900%. In some other embodiments of the present application, the swelling degree of the polymer is 50-1,500%.

Thus, the adsorption performance of the polymer for the organic solvent can be enhanced, and the migration of the solvent of the electrolyte solution into the polymer layer can be delayed, thus reducing the risk of overcharge of the battery.

In the present application, the test method for the polymer swelling degree involves:

scraping a polymer film onto a glass plate, taking a polymer membrane with a size of 1 cm×1 cm, weighing the polymer membrane on a precision balance to obtain an initial mass $M_1$, adding the polymer membrane to dimethyl carbonate for soaking for 12 h, and taking out and then weighing the mass $M_2$ of the polymer membrane. The mass gain is $M_2-M_1$.

The polymer swelling degree (C) is calculated according to the following formula: $C=(M_2-M_1)/M_1\times100\%$.

In some embodiments of the present application, the crosslinking density of the polymer is 1-100%, e.g., 3-99%, 5-98%, 7-97%, 10-96%, 15-96%, 20-95%, 25-90%, 30-85%, 35-80%, 40-75%, 45-70%, 50-65%, and 55-60%. In some embodiments of the present application, the crosslinking density of the polymer is 30-70%. Thus, the liquid absorption and retention performance of the polymer can be improved, and the direct contact between the positive electrode active material and the solvent in the electrolyte solution of the battery can be blocked, thereby avoiding oxidative decomposition of the solvent of the electrolyte solution and reducing the risk of overcharge of the battery.

In the present application, "the crosslinking density of the polymer" is a physical quantity used to express the crosslinking degree of the polymer, i.e., the fraction of the crosslinked structural unit Nc in the crosslinking chain to the total structural unit N. The crosslinking density can be determined by nuclear magnetic crosslinking densitometer. Specifically, in an embodiment of the present application, it can be determined by IIC XLDS-15 cross-linking densitometer.

In some embodiments of the present application, the number average molecular weight of the polymer is 10,000-1,000,000, e.g., 50,000-950,000, 100,000-900,000, 150,000-850,000, 200,000-800,000, 250,000-750,000, 300,000-700,000, 350,000-650,000, 400,000-600,000, 450,000-550,000, and 450,000-500,000. In some other embodiments of the present application, the number average molecular weight of the polymer is 50,000-600,000.

In the present application, "the number average molecular weight of the polymer" can be tested by gel permeation chromatography.

In some embodiments of the present application, the polymer comprises the following repeating unit:

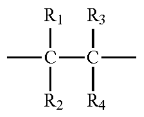

where $R_1$-$R_4$ each independently include H, alkyl, F, Cl, Br, I, C≡N, phenyl, pyrrolyl, pyrrolidonyl, sulfonic acid group, sulfonate group, benzenesulfonate group, carboxylic acid group, and carbonic acid group. In the present application, "alkyl" is a hydrocarbon group formed by subtracting one hydrogen atom from an alkane molecule, such as methyl, such as methyl ($—CH_3$), ethyl ($—CH_2CH_3$), n-propyl ($—CH_2CH_2CH_3$), isopropyl ($—CH(CH_3)_2$), n-butyl ($—CH_2CH_2CH_2CH_3$), tert-butyl ($—C(CH_3)_3$), n-phenyl ($—CH_2CH_2CH_2CH_2CH_3$), isopentyl ($—CH(CH_3)$ $CH_2CH_2CH_3$), 2-methylbutyl ($—CH_2CH(CH_3)CH_2CH_3$), n-hexyl ($CH_3(CH_2)_4CH_2—$), and 2-methylpentyl ($—CH_3CH_2CH_2CH(CH_3)_2$). The "sulfonate group" can include a sodium sulfonate group. The "benzenesulfonate group" can include a sodium benzenesulfonate group.

By way of example, the repeating unit includes at least one of the following structural formulas.

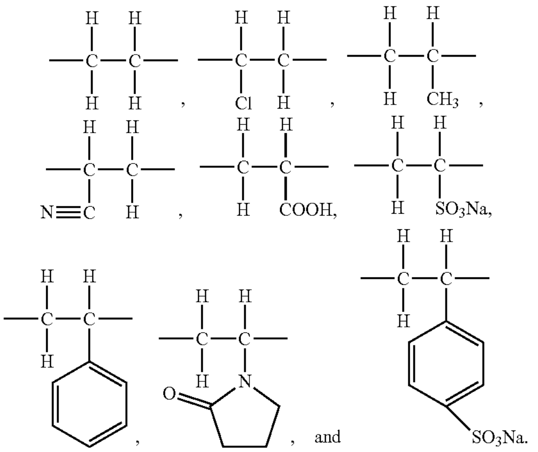

Thus, by filling the polymer with the organic solvent, the direct contact between the positive electrode active material and the solvent in the electrolyte solution of the battery can be blocked, thereby avoiding oxidative decomposition of the solvent of the electrolyte solution and reducing the risk of overcharge of the battery.

In some embodiments of the present application, the polymer layer can further comprise an electrolyte salt. Thus, the ion conductivity of the polymer layer can be improved.

In the present application, when the battery is a lithium-ion battery, the electrolyte salt can include, by way of example, one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluoro bis(oxalato) phosphate (LiDFOP), lithium tetrafluoro(oxalato)phosphate (LiTFOP), etc.

When the battery is a sodium-ion battery, as an example, the electrolyte sodium salt can include, by way of example, at least one of sodium hexafluorophosphate, sodium difluoro (oxalato)borate, sodium tetrafluoroborate, sodium bis(oxalato)borate, sodium perchlorate, sodium hexafluoroarsenate, sodium bis(fluorosulfonyl)imide, sodium trifluoromethylsulfonate, and sodium bis(trifluoromethylsulfonyl)imide.

In some embodiments of the present application, based on the total amount of the organic solvent and the electrolyte salt, the concentration of the electrolyte salt can be 0.1-10 mol/L, e.g., 0.5-9.5 mol/L, 1-9 mol/L, 1.5-8.5 mol/L, 2-8 mol/L, 2.5-7.5 mol/L, 3-7 mol/L, 3.5-6.5 mol/L, 4-6 mol/L, 4.5-5.5 mol/L, and 4.8-5 mol/L. In some other embodiments of the present application, based on the total amount of the organic solvent and the electrolyte salt, the concentration of the electrolyte salt can be 0.5-5 mol/L. Thus, by adding the electrolyte salt with the above concentration to the polymer layer, the ion conductivity of the polymer layer can be improved.

In some embodiments of the present application, the polymer layer further comprises at least one of a film-forming additive and an adsorption additive. The electrochemical oxidation window of the film-forming additive is less than or equal to 4 V, and the electrochemical oxidation window of the adsorption additive is higher than 4 V. Thus, by using a film-forming additive with an electrochemical oxidation window of less than or equal to 4 V, the film-forming additive undergoes oxidative decomposition at the positive electrode side under high cut-off voltage (>4 V) charging condition to form a protective film on the surface of the positive electrode active particles, and the protective film can further block the direct contact between the positive electrode active material and the solvent in the electrolyte solution of the battery, thereby avoiding oxidative decomposition of the solvent of the electrolyte solution and reducing the risk of overcharge of the battery. The adsorption additive can be adsorbed on the surface of the positive electrode active material to inhibit the change of the interface structure of the positive electrode active material and improve the cycling stability of the positive electrode plate. Moreover, in the present application, by using an adsorption additive with an electrochemical oxidation window of higher than 4 V, the oxidation reaction of the adsorptive additive on the positive electrode side can be reduced, thereby reducing the risk of overcharge of the battery.

In the present application, for the test method for "the electrochemical oxidation window of the film-forming additive and the adsorption additive", reference can be made to the above test method for "the electrochemical oxidation window of the organic solvent". In order to reduce the side reactions of the polymer on the positive electrode side, the electrochemical oxidation window of the adsorption additive used in the present application is higher than the cut-off voltage during the charging process of the battery.

In some embodiments of the present application, the mass ratio of the polymer to the film-forming additive to the adsorption additive in the polymer layer can be (10-100):(0-90):(0-90), e.g., (20-90):(0-90):(0-90), (30-80):(0-90):(0-90), (40-70):(0-90):(0-90), (50-60):(0-90):(0-90), (10-100):(10-80):(0-90), (10-100):(20-70):(0-90), (10-100):(30-60):(0-90), (10-100):(40-50):(0-90), (10-100):(0-90):(10-80), (10-100):(0-90):(20-70), (10-100):(0-90):(30-60), or (10-100):(0-90):(40-50). In some other embodiments of the present application, the mass ratio of the polymer to the film-forming additive to the adsorption additive in the polymer layer is (30-80):(20-70):(20-70). Thus, by using the polymer layer having the above composition, on the one hand, the cycling stability of the positive electrode plate can be improved; on the other hand, the side reaction on the positive electrode side can be reduced, thereby reducing the risk of overcharge of the battery.

By way of example, the film-forming additive includes, but is not limited to, at least one of bis(oxalato)borate, difluoro(oxalato)borate, difluorophosphate, methyl trifluoroethyl carbonate, tris(pentafluorophenyl)borane, fluoroethylene carbonate, methyl trifluoroethyl carbonate, and propylene trifluorocarbonate. For example, when the battery is a lithium-ion battery, corresponding lithium salts of bis (oxalato)borate, difluoro(oxalato)borate, and difluorophosphate, i.e., lithium bis(oxalato)borate, lithium difluoro(oxalato)borate, and lithium difluorophosphate, are used, and when the battery is a sodium-ion battery, corresponding sodium salts of bis(oxalato)borate, difluoro(oxalato)borate, and difluorophosphate, i.e., sodium bis(oxalato)borate, sodium difluoro(oxalato)borate, and sodium difluorophosphate, are used. The adsorption additive includes, but is not limited to, at least one of a carbonate, a phosphate, a nitrile, and an ionic liquid, for example, the carbonate includes, but is not limited to, at least one of ethyl methyl carbonate, ethylene carbonate, and propylene carbonate, the phosphate includes, but is not limited to, at least one of dimethyl phenylphosphonate and dimethyl benzylphosphonate, the nitrile includes, but is not limited to, at least one of acetonitrile and succinonitrile, and the ionic liquid includes, but is not limited to, 1-butyl-3-methylimidazolium hexafluorophosphate, e.g., lithium 1-butyl-3-methylimidazolium hexafluorophosphate or sodium 1-butyl-3-methylimidazolium hexafluorophosphate.

Figure 2:
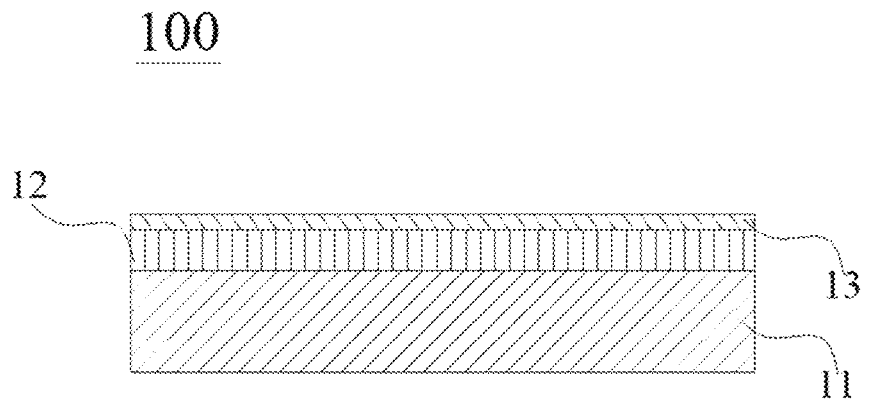
FIG. 2 is a schematic structural view of a positive electrode plate according to another embodiment of the present application.

In some embodiments of the present application, referring to FIG. 2, the positive electrode plate 100 of the present application comprises a positive electrode current collector 11, a positive electrode active material layer 12, and a protective layer 13. The positive electrode active material layer 12 is arranged on at least one side of the positive electrode current collector 11, the protective layer 13 is arranged on at least one side of the positive electrode active material layer 12, and the protective layer 12 comprises the polymer and the organic solvent.

Thus, by forming a protective layer 13 comprising a polymer and an organic solvent on the surface of the positive electrode active material layer 12, the protective layer 13 can block the direct contact between the positive electrode active material and the solvent in the electrolyte solution of the battery, thereby avoiding oxidative decomposition of the solvent of the electrolyte solution and reducing the risk of overcharge of the battery. In addition, since the electrochemical oxidation window of the organic solvent is higher than 4 V, that is, the organic solvent will not undergo an oxidation reaction on the positive electrode side under the condition of charging at a high cut-off voltage (>4 V), thereby preventing side reactions on the positive electrode side, and under high-rate charging, the organic solvent is not easily excited for oxidative decomposition, thereby preventing additional electrons from reaching the negative electrode side, preventing an abnormal increase in the battery charging capacity, and thus reducing the risk of overcharge of the battery.

In some embodiments of the present application, the thickness of the protective layer 13 can be 0.1-40 μm, e.g., 0.5-40 μm, 1-38 μm, 2-35 μm, 3-32 μm, 4-30 μm, 5-28 μm, 6-25 μm, 7-23 μm, 8-20 μm, 9-18 μm, 10-16 μm, and 12-15 μm. In some other embodiments of the present application, the thickness of the protective layer 13 can be 1-20 μm; furthermore, the thickness of the protective layer 13 can be 1-10 μm. Thus, the formation of the protective layer 13 having the thickness on the surface of the positive electrode active material layer 12 can not only block the direct contact between the positive electrode active material and the solvent in the electrolyte solution of the battery, thereby avoiding oxidative decomposition of the solvent of the electrolyte solution, but can also reduce the impedance of the positive electrode plate.

In some embodiments of the present application, the mass ratio of the polymer to the organic solvent in the protective layer 13 can be (0.1-99):(1-99.9), e.g., (0.5-98):(1-99.9), (1-97):(1-99.9), (5-95):(1-99.9), (10-90):(1-99.9), (15-85):(1-99.9), (20-80):(1-99.9), (25-75):(1-99.9), (30-70):(1-99.9), (40-60):(1-99.9), (50-60):(1-99.9), (0.1-99):(2-99), (0.1-99):(4-97), (0.1-99):(5-95), (0.1-99):(10-90), (0.1-99):(15-85), (0.1-99):(20-80), (0.1-99):(25-75), (0.1-99):(30-70), (0.1-99):(40-60), and (0.1-99):(50-60). In some other embodiments of the present application, the mass ratio of the polymer to the organic solvent in the protective layer 13 can be (0.1-15):(85-99.9). Thus, the direct contact between the positive electrode active material and the solvent in the electrolyte solution of the battery can be blocked, thereby avoiding oxidative decomposition of the solvent of the electrolyte solution and reducing the risk of overcharge of the battery.

In some embodiments of the present application, the protective layer 13 can further comprise an electrolyte salt. Thus, the ion conductivity of the protective layer can be improved.

In some embodiments of the present application, based on the total amount of the organic solvent and the electrolyte salt, the concentration of the electrolyte salt in the protective layer 13 is 0.1-10 mol/L, e.g., 0.5-9.5 mol/L, 1-9 mol/L, 1.5-8.5 mol/L, 2-8 mol/L, 2.5-7.5 mol/L, 3-7 mol/L, 3.5-6.5 mol/L, 4-6 mol/L, 4.5-5.5 mol/L, and 4.8-5 mol/L. In some other embodiments of the present application, based on the total amount of the organic solvent and the electrolyte salt, the concentration of the electrolyte salt can be 0.5-5 mol/L. Thus, by adding the electrolyte salt with the above concentration to the protective layer, the ion conductivity of the protective layer can be improved.

In some embodiments of the present application, the protective layer 13 further comprises at least one of a film-forming additive and an adsorption additive. Thus, the cycling stability of the positive electrode plate can be improved.

In some embodiments of the present application, the mass ratio of the polymer to the film-forming additive to the adsorption additive in the protective layer 13 is (10-100):(0-90):(0-90), e.g., (20-90):(0-90):(0-90), (30-80):(0-90):(0-90), (40-70):(0-90):(0-90), (50-60):(0-90):(0-90), (10-100):(10-80):(0-90), (10-100):(20-70):(0-90), (10-100):(30-60):(0-90), (10-100):(40-50):(0-90), (10-100):(0-90):(10-80), (10-100):(0-90):(20-70), (10-100):(0-90):(30-60), and (10-100):(0-90):(40-50). In some other embodiments of the present application, the mass ratio of the polymer to the film-forming additive to the adsorption additive in the protective layer 13 is (30-80):(20-70):(20-70). Thus, by using the protective layer having the above composition, on the one hand, the cycling stability of the positive electrode plate can be improved; on the other hand, the side reaction on the positive electrode side can be reduced, thereby reducing the risk of overcharge of the battery.

In the present application, the compositions of the positive electrode active material particles, the binder, and the conductive agent in the positive electrode active material layer 12 in FIG. 2 and the mixing ratio thereof, and the compositions of the organic solvent, the polymer, the electrolyte salt, the adsorption additive, and the film-forming additive in the protective layer 13 are all the same as those described above, and no more details will be given here.

In some embodiments of the present application, the protective layer 13 in FIG. 2 can be formed on the positive electrode active material layer 12 in FIG. 1, that is, a polymer layer comprising a polymer and an organic solvent is formed on the surface of the positive electrode active particles in the positive electrode active material layer 12, and a protective layer 13 comprising a polymer and an organic solvent is then formed on the positive electrode active material layer 12. Thus, the protective layer 13 on the surface of the positive electrode plate and the polymer layer on the surface of the positive electrode active particles can both block the direct contact between the positive electrode active material and the solvent in the electrolyte solution of the battery, thereby avoiding oxidative decomposition of the solvent of the electrolyte solution and reducing the risk of overcharge of the battery.

In a second aspect of the present application, the present application provides a method for preparing a positive electrode plate, comprising: forming a positive electrode plate comprising a polymer and an organic solvent, where the polymer and the organic solvent are located on at least one side of the positive electrode plate away from the positive electrode current collector, the organic solvent is located in the polymer, and the electrochemical oxidation window of the organic solvent is higher than 4 V.

Thus, the positive electrode plate comprising the polymer and the organic solvent can be prepared. The organic solvent is located in the polymer and the polymer and the organic solvent are located on at least one side of the positive electrode plate away from the positive electrode current collector. The polymer filled with the organic solvent can block the direct contact between the positive electrode active material and the solvent in the electrolyte solution of the battery, thereby avoiding the oxidative decomposition of the solvent in the electrolyte solution. In addition, since the electrochemical oxidation window of the organic solvent is higher than 4 V, that is, the organic solvent will not undergo an oxidation reaction on the positive electrode side under the condition of charging at a high cut-off voltage (>4 V), thereby preventing side reactions on the positive electrode side, and under high-rate charging, the organic solvent is not easily excited for oxidative decomposition, thereby preventing additional electrons from reaching the negative electrode side, preventing an abnormal increase in the battery charging capacity, and thus reducing the risk of overcharge of the battery.

In some embodiments of the present application, the method for preparing a positive electrode plate can comprise: forming a positive electrode active material layer comprising positive electrode active particles on at least one side of the positive electrode current collector, and forming a polymer layer comprising the polymer and the organic solvent on the surface of the positive electrode active particles.

By way of example, a polymer is mixed with positive electrode active particles in advance such that the surface of the positive electrode active particles is coated with the polymer, and the coated positive electrode active particles are then mixed with a conductive agent, a binder, and the solvent NMP (N-methyl pyrrolidone), or the polymer and the positive electrode active particles are directly mixed with the conductive agent, the binder, and the solvent NMP (N-methyl pyrrolidone); the positive electrode slurry is then applied to the positive electrode current collector, and the solvent NMP is then removed by roller coating and drying; and finally, the organic solvent is applied to a positive electrode plate by means of soaking, spraying, drop coating, etc., the organic solvent enters the polymer to form a polymer layer on the surface of the positive electrode active particles. An electrolyte salt, an adsorption additive, and a film-forming additive can be introduced into the polymer layer by adding to the organic solvent.

Thus, by forming a polymer layer comprising a polymer and an organic solvent on the surface of the positive electrode active particles, the polymer layer can block the direct contact between the positive electrode active material and the solvent in the electrolyte solution of the battery, thereby avoiding oxidative decomposition of the solvent of the electrolyte solution and reducing the risk of overcharge of the battery.

In some embodiments of the present application, the method for preparing a positive electrode plate can also comprise: forming a positive electrode active material layer on at least one side of the positive electrode current collector; and forming a protective layer comprising the polymer and the organic solvent on at least one side of the positive electrode active material layer.

By way of example, a positive electrode slurry formed by mixing positive electrode active particles with a conductive agent, a binder, and the solvent NMP (N-methyl pyrrolidone) is applied to a positive electrode current collector, a mixed liquid comprising an organic solvent and a polymer is then applied to the positive electrode slurry layer, and the solvent NMP and the organic solvent are removed by roller coating and drying; or the positive electrode slurry formed by mixing the positive electrode active particles with the conductive agent, the binder, and the solvent NMP (N-methyl pyrrolidone) is applied to the positive electrode current collector, and the solvent NMP is then removed by roller coating and drying to form a positive electrode active material layer on the positive electrode current collector, the mixed liquid comprising the organic solvent and the polymer is then applied to the positive electrode active material layer, and the organic solvent is removed by roller coating and drying, thereby forming a positive electrode active material layer and a polymer layer on the surface of the positive electrode current collector in order; and finally, the organic solvent is applied to the positive electrode plate by means of soaking, spraying, drop coating, etc., the organic solvent enters the polymer layer to form a protective layer. An electrolyte salt, an adsorption additive, and a film-forming additive can be introduced into the protective layer by adding to the organic solvent.

Thus, by forming a protective layer comprising a polymer and an organic solvent on the surface of the positive electrode active material layer, the protective layer can block the direct contact between the positive electrode active material and the solvent in the electrolyte solution of the battery, thereby avoiding oxidative decomposition of the solvent of the electrolyte solution and reducing the risk of overcharge of the battery.

A third aspect of the present application provides a battery, comprising the positive electrode plate described above in the first aspect or a positive electrode plate obtained by the method described above in the second aspect.

The battery refers to a battery that can be used continually by activating an active material in a charging manner, after the battery is discharged.

It can be understood that the battery proposed in the present application can be a lithium-ion battery or a sodium-ion battery.

Generally, the battery comprises a positive electrode plate, a negative electrode plate, a separator, and an electrolyte solution. During the charging and discharging process of the battery, active ions are intercalated and deintercalated back and forth between the positive electrode plate and the negative electrode plate. The separator is arranged between the positive electrode plate and the negative electrode plate and serves the function of isolation. The electrolyte serves to conduct ions between the positive electrode plate and the negative electrode plate.

[Negative Electrode Plate]

In the battery, the negative electrode plate generally comprises a negative electrode current collector and a negative positive active material layer arranged on the negative electrode current collector, and the negative electrode active material layer comprises a negative electrode active material.

The negative electrode plate can also only comprise a negative electrode current collector, that is, it does not comprise a negative electrode active material. The negative electrode plate may also only comprise a metal phase pre-deposited on the negative electrode current collector. The negative electrode current collector can be made of a material such as a conventional metal foil, a carbon-coated metal foil, or a porous metal plate. By way of example, the negative electrode current collector can also be a copper foil or an aluminum foil.

The specific type of the negative electrode active material is not limited. Active materials known in the art that can be used as active materials for negative electrodes of secondary batteries can be used, and those skilled in the art can make a choice according to actual needs. By way of example, the negative electrode active material can include, but is not limited to, one or more of lithium metal, sodium metal, carbon material, alloy material, transition metal oxide and/or sulfide, phosphorus-based material, and titanate material. Specifically, the carbon material can include one or more of hard carbon, soft carbon, amorphous carbon, and a nano-structured carbon material; the alloy material can include alloy materials formed from one or more of Si, Ge, Sn, Pb, and Sb; the general formula of the transition metal oxides and sulfides is $M_xN_y$, in which M includes one or more of Fe, Co, Ni, Mn, Sn, Mo, Sb, V, N includes O or S; the phosphorus-based material can include one or more of red phosphorus, white phosphorus, and black phosphorus; and the titanate material can include one or more of $Na_2Ti_3O_7$, $Na_2Ti_6O_{13}$, $Na_4Ti_5O_{12}$, $Li_4Ti_5O_{12}$, and $NaTi_2(PO_4)_3$. These materials are all commercially available.

The negative electrode active material layer generally further comprises optionally a binder and a conductive agent. The conductive agent is used for improving the conductivity of the negative electrode active material layer, and the binder is used for firmly bonding the negative electrode active material and the binder to the negative electrode current collector. In the present application, the types of the conductive agent and the binder are not specifically limited and can be selected according to actual needs.

By way of example, the conductive agent can comprise one or more of superconducting carbon, acetylene black, carbon black, Ketjen black, carbon dots, carbon nanotubes, graphene, and carbon nanofibers.

By way of example, the binder can include one or more of styrene butadiene rubber (SBR), styrene-butadiene-styrene block copolymer (SBCs), a water-based acrylic resin, and carboxymethyl cellulose (CMC).

The negative electrode active material layer further comprises optionally a thickener, such as carboxymethyl cellulose (CMC). However, the present application is not limited thereto, and other materials that can be used as thickeners for negative electrode plates of secondary batteries can also be used.

[Separator]

The above separator is not particularly limited in the present application, and any well-known separator having a porous structure with electrochemical stability and mechanical stability can be selected according to actual needs, for example, it can be a single-layer or multi-layer thin film comprising one or more of glass fibers, non-woven fabric, polyethylene, polypropylene, and polyvinylidene fluoride.

[Electrolyte Solution]

The electrolyte solution serves to conduct ions between the positive electrode plate and the negative electrode plate. The electrolyte solution used for the battery of the present application comprises a main solvent, and the main solvent is different from the organic solvent in the positive electrode plate.

In some embodiments of the present application, the electrochemical oxidation window of the main solvent is less than or equal to 4 V, and thus, the electrolyte solution having the composition does easily undergoes side reactions on the negative electrode side during the charging process of the battery, thereby deteriorating the negative electrode, thus reducing the cycling performance of the battery.

In the present application, for the test of "the electrochemical oxidation window of the main solvent", reference can be made to the above test method for "the electrochemical oxidation window of the organic solvent".

By way of example, the main solvent can include at least one of ethers and/or fluorinated ethers, e.g., ethylene glycol dimethyl ether, ethylene glycol diethyl ether, diethylene glycol dimethyl ether, triethylene glycol dimethyl ether, tetraethylene glycol dimethyl ether, 1,3-dioxolane, tetrahydrofuran, methyltetrahydrofuran, diphenyl ether, crown ether, 1,1,2,2-tetrafluoroethyl-2,2,3,3-tetrafluoropropyl ether, methyl nonafluorobutyl ether, and octafluoropentyl-tetrafluoroethyl ether.

By way of example, the electrolyte solution used for the battery of the present application further comprises an electrolyte salt. The electrolyte salt is the same as described above, and no more details will be given here.

Figure 3:
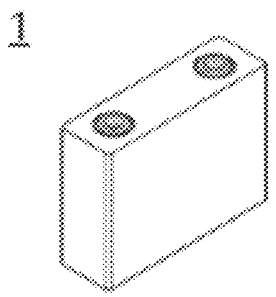
FIG. 3 is a schematic structural view of a battery according to an embodiment of the present application.

The shape of the battery is not specially limited in the embodiments of the present application and can be cylindrical, square, or any other shape. FIG. 3 is a secondary battery 1 with a square structure as an example.

In some embodiments, the secondary battery can comprise an outer package. The outer package can be used for encapsulating the positive electrode plate, the negative electrode plate, and the electrolyte.

In some embodiments, the outer package can comprise a case and a cover plate. The case can comprise a bottom plate and a side plate connected to the bottom plate, with the bottom plate and the side plate enclosing to form an accommodating cavity. The case has an opening in communication with the accommodating cavity, and the cover plate can cover the opening to close the accommodating cavity.

The positive electrode plate, the negative electrode plate, and the separator can be made into an electrode assembly by a winding process or a lamination process. The electrode assembly is encapsulated into the accommodating cavity. The electrolyte solution can be an electrolyte solution, and the electrolyte solution infiltrates the electrode assembly. The number of electrode assemblies contained in the sodium-ion battery can be one or more and can be adjusted according to needs.

In some embodiments, the outer package of the battery can be a hard case, such as a hard plastic case, an aluminum case, or a steel case.

The outer package of the battery can also be a soft package, such as a pouch-type soft package. The material of the soft package can be plastic, and for example may include one or more of polypropylene (PP), polybutylene terephthalate (PBT), and polybutylene succinate (PBS).

In some embodiments, batteries can be assembled into a battery module, the number of secondary batteries included in the battery module can be multiple, and the specific number can be adjusted according to the application and capacity of the battery module.

Figure 4:
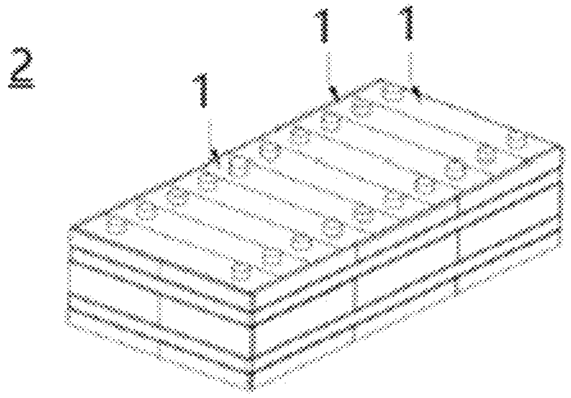
FIG. 4 is a schematic structural view of a battery module according to an embodiment of the present application.

FIG. 4 is a battery module 2 as an example. With reference to FIG. 4, in the battery module 2, a plurality of batteries 1 can be arranged sequentially along the length direction of the battery module 2. Of course, they can also be arranged in any other manner. The plurality of batteries 1 can be further fixed by fasteners.

The battery module 2 can further comprise a shell having an accommodating space, in which the plurality of batteries 1 are accommodated. In some embodiments, the above battery modules can be further assembled into a battery pack, and the number of battery modules contained in the battery pack can be adjusted according to the application and capacity of the battery pack.

Figure 5:
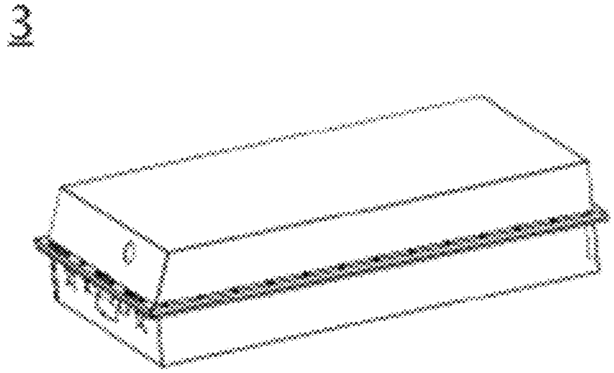
FIG. 5 is a schematic structural view of a battery pack according to an embodiment of the present application.
Figure 6:
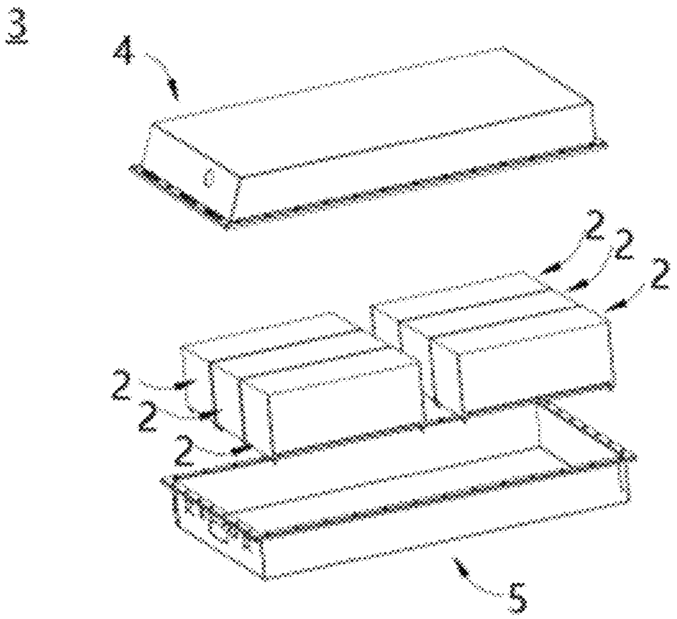
FIG. 6 is an exploded view of FIG. 5.

FIGS. 5 and 6 are a battery pack 3 as an example. Referring to FIGS. 5 and 6, the battery pack 3 can comprise a battery box and a plurality of battery modules 2 arranged in the battery box. The battery box comprises an upper box 4 and a lower box 5. The upper box 4 can cover the lower box 5 to form an enclosed space for accommodating the battery module 2. The plurality of battery modules 2 can be arranged in the battery box in any manner.

[Electrical Apparatus]

The present application further provides an electrical apparatus, comprising at least one of the battery, the battery module, and the battery pack. The battery cell, the battery module, or the battery pack can be used either as a power source for the electrical apparatus or as an energy storage unit for the electrical apparatus. The electrical apparatus may be, but is not limited to, a mobile device (such as a mobile phone or a laptop), an electric vehicle (such as an all-electric vehicle, a hybrid electric vehicle, a plug-in hybrid electric vehicle, an electric bicycle, an electric scooter, an electric golf cart, or an electric truck), an electric train, a ship, a satellite, and an energy storage system.

For the electrical apparatus, the battery, the battery module, or the battery pack can be selected according to the use requirements thereof.

Figure 7:
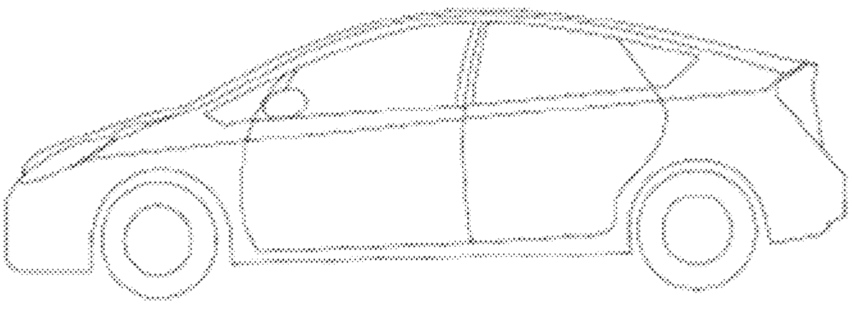
FIG. 7 is a schematic view of an embodiment of an electrical apparatus in which a battery is used as a power source.

FIG. 7 is an electrical apparatus as an example. The electrical apparatus includes an all-electric vehicle, a hybrid electric vehicle, or a plug-in hybrid electric vehicle. To satisfy the need of the electrical apparatus for a high power and high energy density of batteries, a battery pack or a battery module can be used.

As another example, the electrical apparatus can include a mobile phone, a tablet, and a laptop. The electrical apparatus is generally required to be light and thin and can use a battery as a power source.

To make the technical problem to be solved by the embodiments of the present application, the technical solutions, and the beneficial effects clearer, the present application is further described below in detail with reference to embodiments and the accompanying drawings. It is clear that the described embodiments are only some, rather than all, of the embodiments of the present application. The following description of at least one exemplary embodiment is actually merely illustrative and by no means constitutes any limitation on the present application and the use thereof. All other embodiments obtained by those of ordinary skill in the art based on the embodiments of the present application without involving any creative effort shall fall within the scope of protection of the present application.

Example 1

1. Preparation of Positive Electrode Plate

Positive electrode active particles of $LiNi_{0.8}Co_{0.1}Mn_{0.1}O_2$ were uniformly mixed with polyacrylonitrile in advance such that the surface of the positive electrode active particles was coated with the polymer, and the coated positive electrode active particles was then uniformly mixed with carbon black used as a conductive agent, polyvinylidene fluoride used as a binder, and the solvent NMP to obtain a positive electrode slurry (the mass ratio of the positive electrode active particles of $LiNi_{0.8}Co_{0.1}Mn_{0.1}O_2$ to the polyacrylonitrile to the carbon black used as a conductive agent to the polyvinylidene fluoride used as a binder was 97.5:0.5:1:1, and the solid content of the positive electrode slurry was 60%); the positive electrode slurry was applied to the upper and lower surfaces of a carbon-coated aluminum foil used as a positive electrode current collector, and the solvent NMP was then removed by roller coating and drying to form a positive electrode active material layer with a thickness of 40 μm on the copper foil; and finally, the electrode plate was soaked in a mixed liquid comprising an electrolyte salt, an organic solvent, an adsorption additive, and a film-forming additive, so that the organic solvent, the adsorption additive, and the film-forming additive infiltrated the polymer in the surface of the positive electrode active particles to form a polymer layer to obtain a positive electrode plate. The compositions of the polymer, the organic solvent, the adsorption additive, and the film-forming additive and the components thereof are as shown in Table 1.

2. Preparation of Negative Electrode Plate

Graphite and sodium carboxymethyl cellulose used as a binder were added to water in a mass ratio of 4:1.6 and stirred to form a uniform negative electrode slurry. The negative electrode slurry was applied to upper and lower surfaces of a copper foil, then transferred to a vacuum drying oven for complete drying, and then punched to obtain a negative electrode plate.

3. Preparation of Electrolyte Solution

In a glove box in an argon atmosphere ($H_2O$<0.1 ppm and $O_2$<0.1 ppm), the lithium salt lithium bis(fluorosulfonyl) imide (LiFSI) was dissolved in a mixed solvent of the organic solvents ethylene glycol dimethyl ether (DME) and 1,1,2,2-tetrafluoroethyl-2,2,3,3-tetrafluoropropyl ether and uniformly stirred to obtain an electrolyte solution with a concentration of 4 mol/L.

4. Separator

A polypropylene film was used as the separator.

5. Preparation of Secondary Battery

The positive electrode plate, the separator, and the negative electrode plate were stacked in sequence, so that the separator was located between the positive electrode plate and the negative electrode plate and served the function of isolation, and the stack was then wound to obtain an electrode assembly; and the electrode assembly was placed in an outer package, the electrolyte solution prepared above was injected into a dried lithium-ion battery, and vacuum encapsulation, standing, formation and shaping procedures were then performed to obtain a lithium-ion battery.

The preparation method for the lithium-ion batteries of Examples 2-42 is the same as that of Example 1, except that the composition of the prepared positive electrode plate is different, specifically as shown in Table 1.

TABLE 1

| | Thickness | Composition of polymer | Swelling ratio of polymer, % | Number-average molecular weight of polymer | Composition of organic solvent | Mass ratio of polymer to organic solvent | Composition of electrolyte salt | Electrolyte salt concentration (mol/L) | Composition of adsorption additive | Composition of film-forming additive | Mass ratio of polymer to adsorption additive to film-forming additive |
|---|---|---|---|---|---|---|---|---|---|---|---|
| Comparative Example | / | / | / | / | / | / | / | / | / | / | / |
| Example 1 | 0.01 | Polyethylene | 100 | 300,000-600,000 | Ethylene carbonate | 10:90 | / | / | / | / | / |
| Example 2 | 0.05 | Polyethylene | 100 | 300,000-600,000 | Ethylene carbonate | 10:90 | / | / | / | / | / |
| Example 3 | 0.1 | Polyethylene | 100 | 300,000-600,000 | Ethylene carbonate | 10:90 | / | / | / | / | / |
| Example 4 | 0.15 | Polyethylene | 100 | 300,000-600,000 | Ethylene carbonate | 10:90 | / | / | / | / | / |
| Example 5 | 0.5 | Polyethylene | 100 | 300,000-600,000 | Ethylene carbonate | 10:90 | / | / | / | / | / |
| Example 6 | 1 | Polyethylene | 100 | 300,000-600,000 | Ethylene carbonate | 10:90 | / | / | / | / | / |
| Example 7 | 2 | Polyethylene | 100 | 300,000-600,000 | Ethylene carbonate | 10:90 | / | / | / | / | / |
| Example 8 | 0.1 | Polyvinyl-pyrrolidone | 20 | 800,000-1,000,000 | Ethylene carbonate | 10:90 | / | / | / | / | / |
| Example 9 | 0.1 | Polyvinyl-pyrrolidone | 50 | 500,000-800000 | Ethylene carbonate | 10:90 | / | / | / | / | / |
| Example 10 | 0.1 | Polyvinyl-pyrrolidone | 150 | 200,000-500,000 | Ethylene carbonate | 10:90 | / | / | / | / | / |
| Example 11 | 0.1 | Polyvinyl-pyrrolidone | 200 | 100,000-200,000 | Ethylene carbonate | 10:90 | / | / | / | / | / |
| Example 12 | 0.1 | Polyvinyl-pyrrolidone | 300 | 50,000-100000 | Ethylene carbonate | 10:90 | / | / | / | / | / |
| Example 13 | 0.1 | Polystyrene | 100 | 300,000-600,000 | Propyl acetate | 10:90 | / | / | / | / | / |
| Example 14 | 0.1 | Polystyrene | 100 | 300,000-600,000 | n-Pentane | 10:90 | / | / | / | / | / |
| Example 15 | 0.1 | Polystyrene | 100 | 300,000-600,000 | n-Pentane | 10:90 | / | / | / | / | / |
| Example 16 | 0.1 | Polystyrene | 100 | 300,000-600,000 | Chloro-benzene | 10:90 | / | / | / | / | / |
| Example 17 | 0.1 | Polystyrene | 100 | 300,000-600,000 | Nitro-benzene | 10:90 | / | / | / | / | / |
| Example 18 | 0.1 | Polystyrene | 100 | 300,000-600,000 | Cyano-benzene | 10:90 | / | / | / | / | / |
| Example 19 | 0.1 | Polystyrene | 100 | 300,000-600,000 | Styrene | 10:90 | / | / | / | / | / |
| Example 20 | 0.1 | Polystyrene | 100 | 300,000-600,000 | Phenyl-acetylene | 10:90 | / | / | / | / | / |
| Example 21 | 0.1 | Polystyrene | 100 | 300,000-600,000 | Anisole | 10:90 | / | / | / | / | / |
| Example 22 | 0.1 | Sodium polyethylene sulfonate | 100 | 300,000-600000 | Ethylene carbonate | 1:99 | / | / | / | / | / |
| Example 23 | 0.1 | Sodium polyethylene sulfonate | 100 | 300,000-600,000 | Ethylene carbonate | 10:90 | / | / | / | / | / |
| Example 24 | 0.1 | Sodium polyethylene sulfonate | 100 | 300,000-600,000 | Ethylene carbonate | 20:80 | / | / | / | / | / |
| Example 25 | 0.1 | Sodium polyethylene sulfonate | 100 | 300,000-600,000 | Ethylene carbonate | 30:70 | / | / | / | / | / |
| Example 26 | 0.1 | Sodium polyethylene sulfonate | 100 | 300,000-600,000 | Ethylene carbonate | 40:60 | / | / | / | / | / |
| Example 27 | 0.1 | Polyacry-lonitrile | 300 | 50,000-100,000 | Ethylene carbonate | 10:90 | Lithium hexafluoro-phosphate | 0.1 | / | / | / |
| Example 28 | 0.1 | Polyacry-lonitrile | 300 | 50,000-100,000 | Ethylene carbonate | 10:90 | Lithium hexafluoro-phosphate | 0.5 | / | / | / |
| Example 29 | 0.1 | Polyacry-lonitrile | 300 | 50,000-100,000 | Ethylene carbonate | 10:90 | Lithium hexafluoro-phosphate | 1 | / | / | / |

TABLE 1-continued

| | Thickness | Composition of polymer | Swelling ratio of polymer, % | Number-average molecular weight of polymer | Composition of organic solvent | Mass ratio of polymer to organic solvent | Composition of electrolyte salt | Electrolyte salt concentration (mol/L) | Composition of adsorption additive | Composition of film-forming additive | Mass ratio of polymer to adsorption additive to film-forming additive |
|---|---|---|---|---|---|---|---|---|---|---|---|
| Example 30 | 0.1 | Polyacrylonitrile | 300 | 50,000-100,000 | Ethylene carbonate | 10:90 | Lithium hexafluorophosphate | 2 | / | / | / |
| Example 31 | 0.1 | Polyacrylonitrile | 300 | 50,000-100,000 | Ethylene carbonate | 10:90 | Lithium hexafluorophosphate | 5 | / | / | / |
| Example 32 | 0.1 | Polyacrylonitrile | 300 | 50,000-100,000 | Ethylene carbonate | 10:90 | Lithium hexafluorophosphate | 10 | / | / | / |
| Example 33 | 0.1 | Polyacrylonitrile | 300 | 50,000-100,000 | Ethylene carbonate | 10:90 | / | / | Succinonitrile | Lithium bis(oxalato)borate | 50:25:25 |
| Example 34 | 0.1 | Polyacrylonitrile | 300 | 50,000-100,000 | Ethylene carbonate | 10:90 | / | / | Lithium 1-butyl-3-methylimidazolium hexafluorophosphate | Lithium bis(oxalato)borate | 50:25:25 |
| Example 35 | 0.1 | Polyacrylonitrile | 300 | 50,000-100,000 | Ethylene carbonate | 10:90 | / | / | Dimethyl phenyl phosphonate | Lithium bis(oxalato)borate | 50:25:25 |
| Example 36 | 0.1 | Polyacrylonitrile | 300 | 50,000-100,000 | Ethylene carbonate | 10:90 | Lithium hexafluorophosphate | 1 | Ethyl methyl carbonate | Fluoroethylene carbonate | 50:25:25 |
| Example 37 | 0.1 | Polyacrylonitrile | 300 | 50,000-100,000 | Ethylene carbonate | 10:90 | Lithium hexafluorophosphate | 1 | Ethyl methyl carbonate | Tris(pentafluorophenyl)borane | 50:25:25 |
| Example 38 | 0.1 | Polyacrylonitrile | 300 | 50,000-100,000 | Ethylene carbonate | 10:90 | Lithium hexafluorophosphate | 1 | Ethyl methyl carbonate | Lithium difluoro(oxalato)borate | 50:25:25 |
| Example 39 | 0.1 | Polyacrylonitrile | 300 | 50,000-100,000 | Ethylene carbonate | 10:90 | Lithium hexafluorophosphate | 1 | Ethyl methyl carbonate | Lithium difluoro(oxalato)borate | 10:90:90 |
| Example 40 | 0.1 | Polyacrylonitrile | 300 | 50,000-100,000 | Ethylene carbonate | 10:90 | Lithium hexafluoro phosphate | 1 | Ethyl methyl carbonate | Lithium difluoro(oxalato)borate | 30:70:70 |
| Example 41 | 0.1 | Polyacrylonitrile | 300 | 50,000-100,000 | Ethylene carbonate | 10:90 | Lithium hexafluorophosphate | 1 | Ethyl methyl carbonate | Lithium difluoro(oxalato)borate | 50:30:30 |
| Example 42 | 0.1 | Polyacrylonitrile | 300 | 50,000-100,000 | Ethylene carbonate | 10:90 | Lithium hexafluorophosphate | 1 | Ethyl methyl carbonate | Lithium difluoro(oxalato)borate | 80:20:20 |

Example 43

This comparative example was different from Example 1 in that the preparation method for the positive electrode plate was different, and the remaining steps were the same as in Example 1.

The preparation method for the positive electrode plate comprised:

Positive electrode active particles of $LiNi_{0.8}Co_{0.1}Mn_{0.1}O_2$ were uniformly mixed with carbon black used as a conductive agent, polyvinylidene fluoride used as a binder, and the solvent NMP to obtain a positive electrode slurry (the mass ratio of the positive electrode active particles of $LiNi_{0.8}Co_{0.1}Mn_{0.1}O_2$ to the carbon black used as a conductive agent to the polyvinylidene fluoride used as a binder was 98:1:1, and the solid content of the positive electrode slurry was 60%); the positive electrode slurry was applied to the upper and lower surfaces of a carbon-coated aluminum foil used as a positive electrode current collector, and the solvent NMP and the organic solvent were removed by roller coating and drying to form a positive electrode active material layer (with a thickness of 40 μm) and a polymer layer on the surface of the positive electrode current collector in order; and finally, the obtained electrode plate was soaked in a mixed liquid comprising an electrolyte salt, an organic solvent, an adsorption additive, and a film-forming additive, so that the electrolyte salt, the organic solvent, the adsorption additive, and the film-forming additive infiltrated the polymer layer in the surface of the positive electrode active material layer to form a protective layer to obtain a positive electrode plate. The compositions of the polymer, the organic solvent, the adsorption additive, and the film-forming additive and the components thereof are as shown in Table 2.

The preparation method for the lithium-ion batteries of Examples 44-83 was the same as that of Example 43, except that the composition of the prepared positive electrode plate was different, specifically as shown in Table 2.

TABLE 2

| | Thickness of protective layer/ µm | Composition of polymer | Swelling ratio of polymer/ % | Number-average molecular weight of polymer | Composition of organic solvent | Mass ratio of polymer to organic solvent | Composition of electrolyte salt | Electrolyte salt concentration (mol/L) | Composition of adsorption additive | Composition of film-forming additive | Mass ratio of polymer to adsorption additive to film-forming additive |
|---|---|---|---|---|---|---|---|---|---|---|---|
| Example 43 | 1 | Polyethylene | 100 | 300,000-600,000 | Ethylene carbonate | 5:95 | / | / | / | / | / |
| Example 44 | 5 | Polyethylene | 100 | 300,000-600,000 | Ethylene carbonate | 5:95 | / | / | / | / | / |
| Example 45 | 10 | Polyethylene | 100 | 300,000-600,000 | Ethylene carbonate | 5:95 | / | / | / | / | / |
| Example 46 | 20 | Polyethylene | 100 | 300,000-600,000 | Ethylene carbonate | 5:95 | / | / | / | / | / |
| Example 47 | 30 | Polyethylene | 100 | 300,000-600,000 | Ethylene carbonate | 5:95 | / | / | / | / | / |
| Example 48 | 40 | Polyethylene | 100 | 300,000-600,000 | Ethylene carbonate | 5:95 | / | / | / | / | / |
| Example 49 | 5 | Polyvinyl-pyrrolidone | 20 | 800,000-1,000,00 | Ethylene carbonate | 5:95 | / | / | / | / | / |
| Example 50 | 5 | Polyvinyl-pyrrolidone | 50 | 500,000-800,000 | Ethylene carbonate | 5:95 | / | / | / | / | / |
| Example 51 | 5 | Polyvinyl-pyrrolidone | 150 | 200,000-500,000 | Ethylene carbonate | 5:95 | / | / | / | / | / |
| Example 52 | 5 | Polyvinyl-pyrrolidone | 200 | 100,000-200,000 | Ethylene carbonate | 5:95 | / | / | / | / | / |
| Example 53 | 5 | Polyvinyl-pyrrolidone | 300 | 50,000-100,000 | Ethylene carbonate | 5:95 | / | / | / | / | / |
| Example 54 | 5 | Polystyrene | 100 | 300,000-600,000 | Propyl acetate | 10:90 | / | / | / | / | / |
| Example 55 | 5 | Polystyrene | 100 | 300,000-600,000 | n-Pentane | 10:90 | / | / | / | / | / |
| Example 56 | 5 | Polystyrene | 100 | 300,000-600,000 | n-Pentane | 10:90 | / | / | / | / | / |
| Example 57 | 5 | Polystyrene | 100 | 300,000-600,000 | Chloro-benzene | 10:90 | / | / | / | / | / |
| Example 58 | 5 | Polystyrene | 100 | 300,000-600,000 | Nitro-benzene | 10:90 | / | / | / | / | / |
| Example 59 | 5 | Polystyrene | 100 | 300,000-600,000 | Cyano-benzene | 10:90 | / | / | / | / | / |
| Example 60 | 5 | Polystyrene | 100 | 300,000-600,000 | Styrene | 10:90 | / | / | / | / | / |
| Example 61 | 5 | Polystyrene | 100 | 300,000-600,000 | Phenyl-acetylene | 10:90 | / | / | / | / | / |
| Example 62 | 5 | Polystyrene | 100 | 300,000-600,000 | Anisole | 10:90 | / | / | / | / | / |
| Example 63 | 5 | Sodium polyethylene sulfonate | 100 | 300,000-600,000 | Ethylene carbonate | 1:99 | / | / | / | / | / |
| Example 64 | 5 | Sodium polyethylene sulfonate | 100 | 300,000-600,000 | Ethylene carbonate | 10:90 | / | / | / | / | / |
| Example 65 | 5 | Sodium polyethylene sulfonate | 100 | 300,000-600,000 | Ethylene carbonate | 20:80 | / | / | / | / | / |
| Example 66 | 5 | Sodium polyethylene sulfonate | 100 | 300,000-600,000 | Ethylene carbonate | 30:70 | / | / | / | / | / |
| Example 67 | 5 | Sodium polyethylene sulfonate | 100 | 300,000-600,000 | Ethylene carbonate | 40:60 | / | / | / | / | / |
| Example 68 | 5 | Polyacry-lonitrile | 300 | 50,000-100,000 | Ethylene carbonate | 30:70 | Lithium hexafluoro-phosphate | 0.1 | / | / | / |
| Example 69 | 5 | Polyacry-lonitrile | 300 | 50,000-100,000 | Ethylene carbonate | 30:70 | Lithium hexafluoro-phosphate | 0.5 | / | / | / |
| Example 70 | 5 | Polyacry-lonitrile | 300 | 50,000-100,000 | Ethylene carbonate | 30:70 | Lithium hexafluoro-phosphate | 1 | / | / | / |
| Example 71 | 5 | Polyacry-lonitrile | 300 | 50,000-100,000 | Ethylene carbonate | 30:70 | Lithium hexafluoro-phosphate | 2 | / | / | / |
| Example 72 | 5 | Polyacry-lonitrile | 300 | 50,000-100,000 | Ethylene carbonate | 30:70 | Lithium hexafluoro-phosphate | 5 | / | / | / |

TABLE 2-continued

| | Thickness of protective layer/μm | Composition of polymer | Swelling ratio of polymer/% | Number-average molecular weight of polymer | Composition of organic solvent | Mass ratio of polymer to organic solvent | Composition of electrolyte salt | Electrolyte salt concentration (mol/L) | Composition of adsorption additive | Composition of film-forming additive | Mass ratio of polymer to adsorption additive to film-forming additive |
|---|---|---|---|---|---|---|---|---|---|---|---|
| Example 73 | 5 | Polyacrylonitrile | 300 | 50,000-100,000 | Ethylene carbonate | 30:70 | Lithium hexafluorophosphate | 10 | / | / | / |
| Example 74 | 5 | Polyacrylonitrile | 300 | 50,000-100,000 | Ethylene carbonate | 30:70 | / | / | Succinonitrile | Lithium bis(oxalato)borate | 50:25:25 |
| Example 75 | 5 | Polyacrylonitrile | 300 | 50,000-100,000 | Ethylene carbonate | 30:70 | / | / | Lithium 1-butyl-3-methylimidazolium hexafluorophosphate | Lithium bis(oxalato)borate | 50:25:25 |
| Example 76 | 5 | Polyacrylonitrile | 300 | 50,000-100,000 | Ethylene carbonate | 30:70 | / | / | Dimethyl phenyl phosphonate | Lithium bis(oxalato)borate | 50:25:25 |
| Example 77 | 5 | Polyacrylonitrile | 300 | 50,000-100,000 | Ethylene carbonate | 30:70 | Lithium hexafluorophosphate | 1 | Ethyl methyl carbonate | Fluoroethylene carbonate | 50:25:25 |
| Example 78 | 5 | Polyacrylonitrile | 300 | 50,000-100,000 | Ethylene carbonate | 30:70 | Lithium hexafluorophosphate | 1 | Ethyl methyl carbonate | Tris(pentafluorophenyl)borane | 50:25:25 |
| Example 79 | 5 | Polyacrylonitrile | 300 | 50,000-100,000 | Ethylene carbonate | 30:70 | Lithium hexafluorophosphate | 1 | Ethyl methyl carbonate | Lithium difluoro(oxalato)borate | 50:25:25 |
| Example 80 | 5 | Polyacrylonitrile | 300 | 50,000-100,000 | Ethylene carbonate | 30:70 | Lithium hexafluorophosphate | 1 | Ethyl methyl carbonate | Lithium bis(oxalato)borate | 10:90:90 |
| Example 81 | 5 | Polyacrylonitrile | 300 | 50,000-100,000 | Ethylene carbonate | 30:70 | Lithium hexafluorophosphate | 1 | Ethyl methyl carbonate | Lithium bis(oxalato)borate | 30:70:70 |
| Example 82 | 5 | Polyacrylonitrile | 300 | 50,000-100,000 | Ethylene carbonate | 30:70 | Lithium hexafluorophosphate | 1 | Ethyl methyl carbonate | Lithium bis(oxalato)borate | 50:30:30 |
| Example 83 | 5 | Polyacrylonitrile | 300 | 50,000-100,000 | Ethylene carbonate | 30:70 | Lithium hexafluorophosphate | 1 | Ethyl methyl carbonate | Lithium bis(oxalato)borate | 80:20:20 |

Comparative Example

This comparative example was different from Example 1 in that the preparation method for the positive electrode plate was different, and the remaining steps were the same as in Example 1.

The preparation method for the positive electrode plate comprised:

- uniformly mixing positive electrode active particles of $LiNi_{0.8}Co_{0.1}Mn_{0.1}O_2$ with carbon block used as a conductive agent, polyvinylidene fluoride used as a binder, and the solvent NMP to obtain a positive electrode slurry (the mass ratio of the positive electrode active particles of $LiNi_{0.8}Co_{0.1}Mn_{0.1}O_2$ to the conductive agent carbon black to the binder polyvinylidene fluoride was 98:1:1, and the solid content of the positive electrode slurry was 60%), applying the positive electrode slurry to upper and lower surfaces of the carbon-coated aluminum foil used as a positive electrode current collector, and removing the solvent NMP by roller coating and drying to form a positive electrode active material layer (with a thickness of 40 μm) on the surface of the positive electrode current collector, thereby obtaining a positive electrode plate.

The changes of Coulombic efficiency of the batteries obtained in Examples 1-83 and the comparative example were characterized. The characterization results are as shown in Table 3.

Test of the change of Coulombic efficiency during charging and discharging: A battery was subjected to a charging and discharging test involving performing galvanostatic charging at 2 C until a charge cut-off voltage of 4.3 V was reached and then galvanostatic discharging at 1 C until a discharge cut-off voltage of 2.8 V was reached; then performing galvanostatic charging at 2 C and galvanostatic discharging at 1 C for the number n of cycles; and recording the specific charge capacity $C_0$ at cycle n and the specific discharge capacity $C_1$ at cycle n.

The calculation formula for the Coulombic efficiency (CE) was: CE=specific discharge capacity $C_1$/specific charge capacity $C_0$×100%.

TABLE 3

| | Coulombic efficiency % @cycle n |
|---|---|
| Comparative Example | CE50% @cycle 15 |
| Example 1 | CE50% @cycle 32 |
| Example 2 | CE60% @cycle 31 |
| Example 3 | CE65% @cycle 35 |
| Example 4 | CE70% @cycle 43 |
| Example 5 | CE70% @cycle 47 |
| Example 6 | CE70% @cycle 55 |
| Example 7 | CE50% @cycle 30 |
| Example 8 | CE60% @cycle 21 |

TABLE 3-continued

| | Coulombic efficiency % @cycle n |
|---|---|
| Example 9 | CE60% @cycle 25 |
| Example 10 | CE60% @cycle 30 |
| Example 11 | CE60% @cycle 51 |
| Example 12 | CE60% @cycle 35 |
| Example 13 | CE85% @cycle 63 |
| Example 14 | CE70% @cycle 52 |
| Example 15 | CE55% @cycle 60 |
| Example 16 | CE60% @cycle 54 |
| Example 17 | CE50% @cycle 58 |
| Example 18 | CE60% @cycle 52 |
| Example 19 | CE65% @cycle 66 |
| Example 20 | CE75% @cycle 53 |
| Example 21 | CE70% @cycle 63 |
| Example 22 | CE70% @cycle 54 |
| Example 23 | CE65% @cycle 28 |
| Example 24 | CE60% @cycle 30 |
| Example 25 | CE50% @cycle 32 |
| Example 26 | CE50% @cycle 20 |
| Example 27 | CE55% @cycle 37 |
| Example 28 | CE70% @cycle 50 |
| Example 29 | CE75% @cycle 52 |
| Example 30 | CE65% @cycle 47 |
| Example 31 | CE60% @cycle 38 |
| Example 32 | CE50% @cycle 32 |
| Example 33 | CE80% @cycle 53 |
| Example 34 | CE75% @cycle 53 |
| Example 35 | CE75% @cycle 62 |
| Example 36 | CE80% @cycle 76 |
| Example 37 | CE80% @cycle 81 |
| Example 38 | CE85% @cycle 80 |
| Example 39 | CE60% @cycle 55 |
| Example 40 | CE75% @cycle 78 |
| Example 41 | CE70% @cycle 69 |
| Example 42 | CE65% @cycle 62 |
| Example 43 | CE70% @cycle 40 |
| Example 44 | CE70% @cycle 51 |
| Example 45 | CE70% @cycle 65 |
| Example 46 | CE65% @cycle 35 |
| Example 47 | CE60% @cycle 33 |
| Example 48 | CE60% @cycle 30 |
| Example 49 | CE70% @cycle 18 |
| Example 50 | CE70% @cycle 26 |
| Example 51 | CE70% @cycle 59 |
| Example 52 | CE70% @cycle 60 |
| Example 53 | CE75% @cycle 64 |
| Example 54 | CE75% @cycle 60 |
| Example 55 | CE65% @cycle 53 |
| Example 56 | CE55% @cycle 58 |
| Example 57 | CE60% @cycle 55 |
| Example 58 | CE50% @cycle 54 |
| Example 59 | CE60% @cycle 53 |
| Example 60 | CE65% @cycle 61 |
| Example 61 | CE75% @cycle 50 |
| Example 62 | CE70% @cycle 65 |
| Example 63 | CE70% @cycle 55 |
| Example 64 | CE65% @cycle 37 |
| Example 65 | CE60% @cycle 35 |
| Example 66 | CE50% @cycle 30 |
| Example 67 | CE50% @cycle 23 |
| Example 68 | CE60% @cycle 37 |
| Example 69 | CE65% @cycle 55 |
| Example 70 | CE65% @cycle 57 |
| Example 71 | CE60% @cycle 43 |
| Example 72 | CE60% @cycle 40 |
| Example 73 | CE50% @cycle 25 |
| Example 74 | CE70% @cycle 55 |
| Example 75 | CE70% @cycle 53 |
| Example 76 | CE70% @cycle 62 |
| Example 77 | CE70% @cycle 73 |
| Example 78 | CE75% @cycle 84 |
| Example 79 | CE75% @cycle 78 |
| Example 80 | CE60% @cycle 70 |
| Example 81 | CE70% @cycle 78 |
| Example 82 | CE70% @cycle 71 |
| Example 83 | CE65% @cycle 70 |

Note:
% @cycle 15 can be understood as being the Coulombic efficiency of the battery is 50% after 15 cycles.

As can be seen from Table 3, the Coulombic efficiency of the battery of the comparative example is 50% after 15 cycles, whereas the Coulombic efficiencies of the batteries of Examples 1-83 are significantly higher than that of the comparative example. Thus, it is shown that by forming a polymer layer comprising a polymer and an organic solvent (the electrochemical oxidation window of the organic solvent is higher than 4 V) on the surface of the positive electrode active material particles of the positive electrode plate of the present application to allow for absorption or adsorption of the organic solvent into the polymer, or forming a protective layer comprising a polymer and an organic solvent (the electrochemical oxidation window of the organic solvent is higher than 4 V) on the surface of the active material of the positive electrode plate, the Coulombic efficiency of the battery can be improved, thus reducing the risk of overcharge of the battery.

In the description of this specification, descriptions with reference to the terms such as “an embodiment”, “some embodiments”, “examples”, “specific examples”, or “some examples” mean that specific features, structures, materials, or characteristics described with reference to the embodiment(s) or example(s) are included in at least one embodiment or example of the present application. In this specification, the schematic expression of the above terms does not have to be for the same embodiments or examples. Furthermore, the described specific features, structures, materials, or characteristics can be combined in an appropriate manner in any one or more embodiments or examples. In addition, without contradicting each other, those skilled in the art can integrate and combine the different embodiments or examples described in this specification and the features of the different embodiments or examples.

Although the embodiments of the present application have been shown and described above, it is to be understood that the embodiments are exemplary and cannot be construed as limiting the present application, and those skilled in the art can change, modify, replace and vary the embodiments within the scope of the present application.

What is claimed is:

1. A battery, comprising a positive electrode plate, wherein the positive electrode plate comprises a positive electrode current collector and a positive electrode active material layer arranged on at least one side of the positive electrode current collector, the positive electrode active material layer comprises positive electrode active particles, a surface of the positive electrode active particles has a polymer layer, the polymer layer comprises a polymer and an organic solvent, the organic solvent is located in the polymer, and an electrochemical oxidation window of the organic solvent is higher than 4 V, wherein a thickness of the positive electrode active material layer is 30-60 μm, a thickness of the polymer layer is 0.01-2 μm;

a mass ratio of the polymer to the organic solvent is (0.1-99):(1-99.9).

2. The battery according to claim 1, wherein the positive electrode active material layer further comprises at least one of a binder and a conductive agent, and a mass ratio of the positive electrode active particles to the binder to the conductive agent is (90-100):(0-5):(0-5).

3. The battery according to claim 1, wherein the polymer layer further comprises an electrolyte salt, and based on a total amount of the organic solvent and the electrolyte salt, a concentration of the electrolyte salt is 0.1-10 mol/L.

4. The battery according to claim 1, wherein the polymer layer further comprises at least one of a film-forming additive and an adsorption additive.

5. The battery according to claim 4, wherein an electrochemical oxidation window of the film-forming additive is less than or equal to 4 V;

an electrochemical oxidation window of the adsorption additive is higher than 4 V;

a mass ratio of the polymer to the film-forming additive to the adsorption additive is (10-100):(0-90):(0-90).

6. The battery according to claim 1, wherein the organic solvent comprises at least one of a carbonate, a carboxylate, $C_5$-$C_{16}$ alkane, an aromatic hydrocarbon with an electron-withdrawing group and/or an alkyl group, a nitrile, and a ketone, and the electron-withdrawing group includes at least one of halogen, —$NO_2$, —C≡N, —C═C, —C≡C, and —$OCH_3$.

7. The battery according to claim 1, wherein an electrochemical oxidation window of the polymer is higher than 4 V;

a swelling degree of the polymer is 5-2,000%;

a crosslinking density of the polymer is 1-100%;

a number average molecular weight of the polymer is 10,000-1,000,000.

8. The battery according to claim 1, wherein the polymer comprises the following repeating unit:

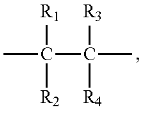

where $R_1$-$R_4$ each independently include H, alkyl, F, Cl, Br, I, C≡N, phenyl, pyrrolyl, pyrrolidonyl, sulfonic acid group, sulfonate group, benzenesulfonate group, carboxylic acid group, and carbonic acid group.

9. The battery according to claim 8, wherein the repeating unit includes at least one of the following structural formulas:

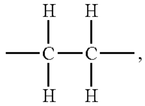, 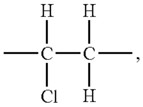, 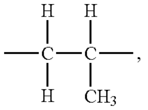,

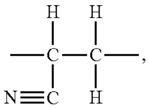, 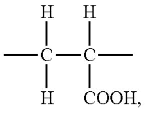 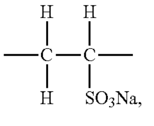

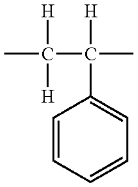, 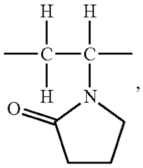, and 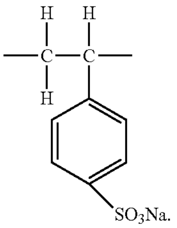

10. The battery according to claim 1, wherein the battery comprises an electrolyte solution, the electrolyte solution comprises a main solvent, and the main solvent is different from the organic solvent in the positive electrode plate;

the electrochemical oxidation window of the main solvent is less than or equal to 4 V.

11. An electrical apparatus, comprising the battery according to claim 1.

12. A battery, comprising a positive electrode plate, wherein the positive electrode plate comprises a positive electrode current collector and a positive electrode active material layer arranged on at least one side of the positive electrode current collector, the positive electrode active material layer comprises positive electrode active particles, a surface of the positive electrode active particles has a polymer layer, the polymer layer comprises a polymer and an organic solvent, the organic solvent is located in the polymer, and an electrochemical oxidation window of the organic solvent is higher than 4 V, wherein the polymer layer further comprises at least one of a film-forming additive and an adsorption additive, an electrochemical oxidation window of the film-forming additive is less than or equal to 4 V, an electrochemical oxidation window of the adsorption additive is higher than 4 V, a mass ratio of the polymer to the film-forming additive to the adsorption additive is (10-100):(0-90):(0-90).

13. The battery according to claim 12, wherein a thickness of the positive electrode active material layer is 30-60 μm, a thickness of the polymer layer is 0.01-2 μm, a mass ratio of the polymer to the organic solvent is (0.1-99):(1-99.9).

14. The battery according to claim 12, wherein the positive electrode active material layer further comprises at least one of a binder and a conductive agent, and a mass ratio of the positive electrode active particles to the binder to the conductive agent is (90-100):(0-5):(0-5).

15. The battery according to claim 12, wherein the polymer layer further comprises an electrolyte salt, based on a total amount of the organic solvent and the electrolyte salt, a concentration of the electrolyte salt is 0.1-10 mol/L.

16. The battery according to claim 12, wherein the organic solvent comprises at least one of a carbonate, a carboxylate, $C_5$-$C_{16}$ alkane, an aromatic hydrocarbon with an electron-withdrawing group and/or an alkyl group, a nitrile, and a ketone, and the electron-withdrawing group includes at least one of halogen, —$NO_2$, —C≡N, —C═C, —C≡C, and —$OCH_3$.

17. The battery according to claim 12, wherein the film-forming additive comprises at least one of bis(oxalato) borate, difluoro(oxalato)borate, difluorophosphate, methyl trifluoroethyl carbonate, tris(pentafluorophenyl)borane, fluoroethylene carbonate, methyl trifluoroethyl carbonate, and propylene trifluorocarbonate;

the adsorption additive comprises at least one of a carbonate, a phosphate, a nitrile, and an ionic liquid.

18. The battery according to claim 12, wherein an electrochemical oxidation window of the polymer is higher than 4 V;

a swelling degree of the polymer is 5-2,000%;

a crosslinking density of the polymer is 1-100%;

a number average molecular weight of the polymer is 10,000-1,000,000.

19. The battery according to claim 12, wherein the polymer comprises the following repeating unit:

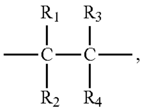

where $R_1$-$R_4$ each independently include H, alkyl, F, Cl, Br, I, C≡N, phenyl, pyrrolyl, pyrrolidonyl, sulfonic acid group, sulfonate group, benzenesulfonate group, carboxylic acid group, and carbonic acid group.

20. The battery according to claim 12, wherein the battery comprises an electrolyte solution, the electrolyte solution comprises a main solvent, and the main solvent is different from the organic solvent in the positive electrode plate;

the electrochemical oxidation window of the main solvent is less than or equal to 4 V.

* * * * *